(12) United States Patent
Acosta et al.

(10) Patent No.: US 10,933,930 B2
(45) Date of Patent: Mar. 2, 2021

(54) ROLLER PATH OF A TRACK PAD FOR A TRACK CHAIN

(71) Applicant: Caterpillar Inc., Peoria, IL (US)

(72) Inventors: Gustavo Acosta, Flossmoor, IL (US); David Jennings Hakes, Brimfield, IL (US); Benoit Abello, Dunlap, IL (US); Benjamin Isaac Jones, Washington, IL (US); Udo Nott, Herdecke (DE)

(73) Assignee: Caterpillar Inc., Peoria, IL (US)

( * ) Notice: Subject to any disclaimer, the term of this patent is extended or adjusted under 35 U.S.C. 154(b) by 330 days.

(21) Appl. No.: 15/943,850

(22) Filed: Apr. 3, 2018

(65) Prior Publication Data

US 2018/0319446 A1    Nov. 8, 2018

Related U.S. Application Data

(60) Provisional application No. 62/501,299, filed on May 4, 2017.

(51) Int. Cl.
| | | |
|---|---|---|
| *B62D 55/20* | (2006.01) | |
| *B62D 55/26* | (2006.01) | |
| *B62D 55/21* | (2006.01) | |
| *B62D 55/14* | (2006.01) | |

(52) U.S. Cl.
CPC .......... *B62D 55/202* (2013.01); *B62D 55/21* (2013.01); *B62D 55/26* (2013.01); *B62D 55/14* (2013.01); *B62D 55/20* (2013.01)

(58) Field of Classification Search
CPC ....... B62D 55/21; B62D 55/202; B62D 55/26
See application file for complete search history.

(56) References Cited

U.S. PATENT DOCUMENTS

| | | |
|---|---|---|
| 1,975,107 A | 10/1934 | Knox |
| 2,452,921 A | 11/1948 | Gillespie |
| 2,999,723 A | 9/1961 | Ostherg |
| 3,007,745 A | 11/1961 | George |
| 3,169,039 A | 2/1965 | Baker et al. |
| 3,171,695 A | 3/1965 | Chalmers |

(Continued)

FOREIGN PATENT DOCUMENTS

| | | |
|---|---|---|
| DE | 1089650 B | 9/1960 |
| DE | 2708538 A1 | 8/1978 |

(Continued)

OTHER PUBLICATIONS

Avspare, Re guild Guidelines for the Suspended Track Roller Frames(4150, 4151) Caterpillar, Web Page, Dec. 2016, Published on the Internet, USA.

*Primary Examiner* — Kip T Kotter
(74) *Attorney, Agent, or Firm* — Law Office of Kurt J. Fugman LLC

(57) ABSTRACT

A track chain assembly comprises a plurality of interlocking track chain members wherein each track chain member defines a track chain traveling direction, a lateral direction perpendicular to the track chain traveling direction, and includes a shoe member defining a shoe width along the lateral direction; and a first track pad member defining a first track pad maximum width along the lateral direction, and a second track pad member defining a second maximum track pad width along the lateral direction, wherein a ratio of either track pad maximum widths to the shoe member width ranges from 1:4 to 3:4.

19 Claims, 14 Drawing Sheets

(56) References Cited

U.S. PATENT DOCUMENTS

| | | |
|---|---|---|
| 3,333,903 A | 8/1967 | Orr et al. |
| 4,176,887 A | 12/1979 | Alpers et al. |
| 4,365,848 A | 12/1982 | Grilli et al. |
| 4,457,565 A | 7/1984 | Bissi |
| 4,904,030 A | 2/1990 | Ono |
| 4,995,678 A | 2/1991 | Jinkens |
| 5,172,965 A | 12/1992 | Taft |
| 5,295,741 A | 3/1994 | Togashi et al. |
| 7,325,889 B2 | 2/2008 | Yamamoto et al. |
| 7,530,650 B2 | 5/2009 | Hannan et al. |
| 9,216,782 B2 | 12/2015 | Kunigk |
| 9,272,742 B2 | 3/2016 | Hisamatsu et al. |
| 9,409,613 B2 | 8/2016 | Hakes |
| 2005/0151421 A1* | 7/2005 | Colwell ............ B62D 55/26 305/185 |
| 2008/0265667 A1 | 10/2008 | Livesay |
| 2008/0284245 A1 | 11/2008 | Livesay et al. |
| 2014/0346856 A1* | 11/2014 | Colwell ............ B62D 55/202 305/185 |
| 2015/0130268 A1* | 5/2015 | Scheuerman ........ B62D 55/15 305/116 |
| 2015/0158536 A1 | 6/2015 | Takagi et al. |
| 2015/0197294 A1* | 7/2015 | Hakes ............ B62D 55/14 305/142 |
| 2016/0023696 A1* | 1/2016 | Hakes ............ G01M 13/00 701/34.4 |
| 2016/0023697 A1 | 1/2016 | Neyer |
| 2016/0176456 A1 | 6/2016 | Oertley |
| 2017/0050688 A1 | 2/2017 | Oertley et al. |
| 2017/0057574 A1* | 3/2017 | Hakes ............ B62D 55/21 |

FOREIGN PATENT DOCUMENTS

| | | | |
|---|---|---|---|
| DE | 202015002177 | 4/2015 | |
| JP | 4431416 B2 | 3/2010 | |
| JP | 5956480 B2 | 7/2016 | |
| WO | 9946158 A1 | 9/1999 | |
| WO | WO-2016153842 A1 * | 9/2016 | ........... B62D 55/205 |

\* cited by examiner

ROLLER PATH OF A TRACK PAD FOR A TRACK CHAIN

TECHNICAL FIELD

The present disclosure relates to track chains that use pins to hold the chain together. Specifically, the present disclosure relates to a pin retention design used to hold track chain members such as track shoes or track links together, helping to prevent the pin from falling out of the track chain members.

BACKGROUND

In many current applications, track chain members such as track links or track shoes are attached to each other using a pin that allows the track chain members to rotate relative to each other while still allowing the chain to remain in tension when installed on the undercarriage of a track type vehicle. If the pin becomes loose or otherwise falls out of the bores of the track chain members, the track chain will fall off the undercarriage of the track type vehicle, requiring maintenance in the field that may be difficult and costly. To help prevent this from happening, different devices have been employed to retain the pin in the bores of the track chain members.

One such device that has been used is a snap ring with a welded plate on a floating plate that blocks the egress of the pin from the bore of the track chain member. This device has had problems. For example, it is difficult to service the pin when needed due to the presence of the welded plate. If the welded plate is not provided, the likelihood of the snap ring twisting out of its retention groove adjacent the pin retaining bore is increased. Therefore, this solution has proven to be unsatisfactory in some applications.

Similarly, another solution has been to use a bolt and nut combination to hold the pin in place. However, it is often necessary to weld the nut to the bolt making servicing the pin difficult. Also, the nut and bolt are often exposed on the side of the track chain member, allowing them to become damaged. This may make disassembly difficult.

In other applications, under uneven mine floor conditions, the track pad or other portion of the track chain member undulates causing high stress on the outer roller path as the surface of a track roller or idler wheel is no longer pressing flat or in a parallel manner onto the pad. The high stresses may cause fracturing or spalling of the track chain member, necessitating unwanted maintenance. Even on flat surfaces or terrain, the high loads encountered by the track chain member created by the weight of the machine may also cause fracturing or spalling over time. This too may lead to maintenance sooner than desired.

Similarly, the shoe member may bend relative to the track pad of the track chain member when subjected to high stress created by the weight and/or payload of the machine as well as movement of the track as it encounters obstacles, etc.

Various previous attempted solutions to withstand the stress concentrations in the track chain member have been to harden the track chain member. However, it has proven difficult to achieve the desired hardening depth of previous track chain members.

SUMMARY

A track chain member according to an embodiment of the present disclosure comprises a shoe member defining a track chain traveling direction and a lateral direction perpendicular to the track chain traveling direction, and a track pad member extending from the shoe member including a first lug member extending from the shoe member in a first direction parallel to the track chain traveling direction, a second lug member and a third lug member both extending from the shoe member in a second direction opposite of the first direction, wherein the first, second and third lug members define a Y-shaped configuration and the first lug defines a first lug width along the lateral direction and the track pad member defines a roller support surface defining a roller support surface width along the lateral direction and the first lug width ranges from 40-60% of the roller support surface width.

A track chain assembly according to an embodiment of the present disclosure comprises a plurality of interlocking track chain members wherein each track chain member defines a track chain traveling direction, a lateral direction perpendicular to the track chain traveling direction, and includes a shoe member defining a shoe width along the lateral direction; and a first track pad member defining a first track pad maximum width along the lateral direction, and a second track pad member defining a second maximum track pad width along the lateral direction, wherein a ratio of either the first or second track pad maximum widths to the shoe member width ranges from 1:4 to 3:4.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
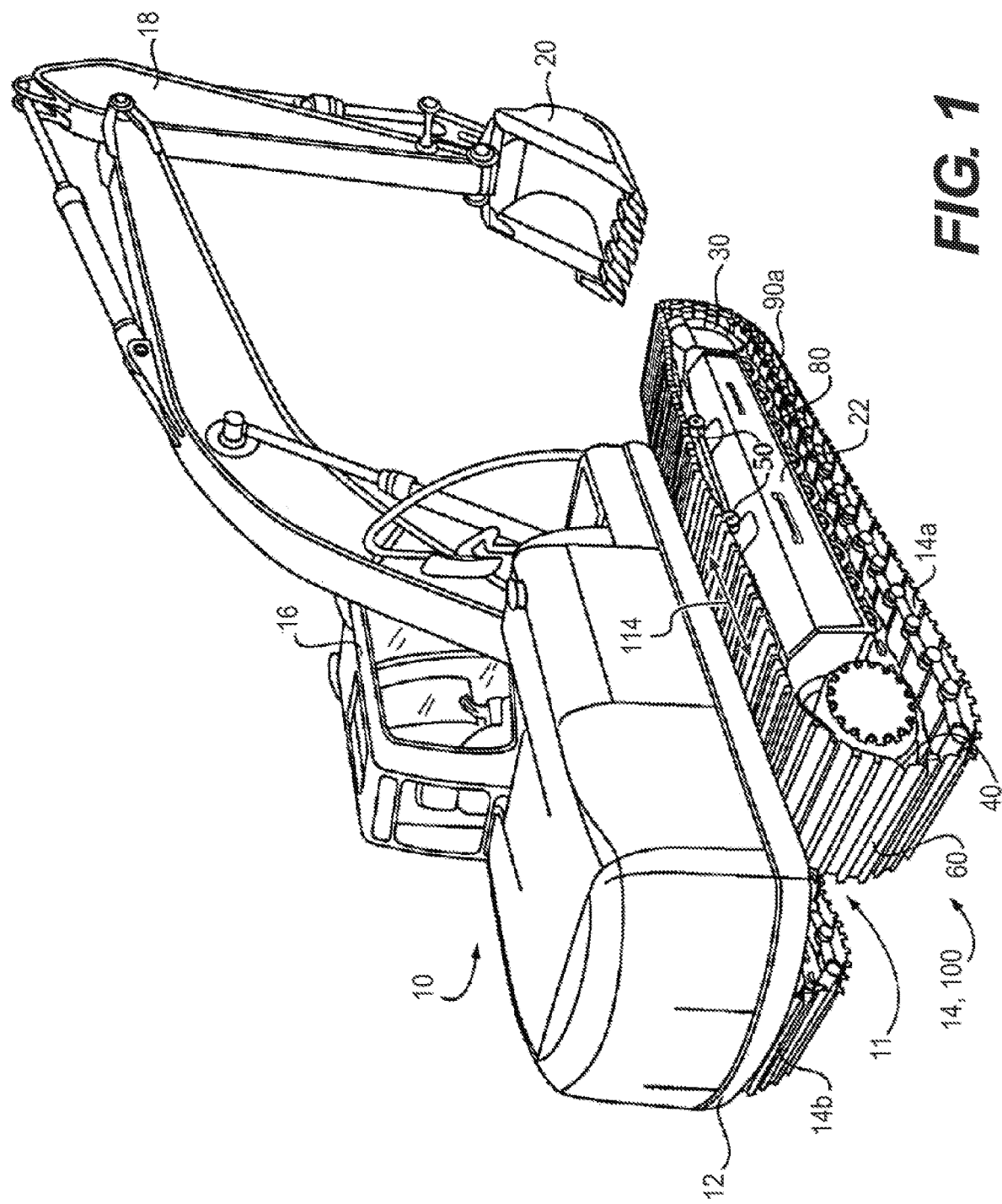
FIG. 1 is a perspective view of a machine such as an excavator that has track chains that use an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a pin retention design that includes a bolt, washer, nut and spacer that are positioned near the longitudinal end of a track pin. This may prevent the track pin from egressing out of a track pin bore found in a track chain member while the track chain is in used on a machine.

Figure 2:
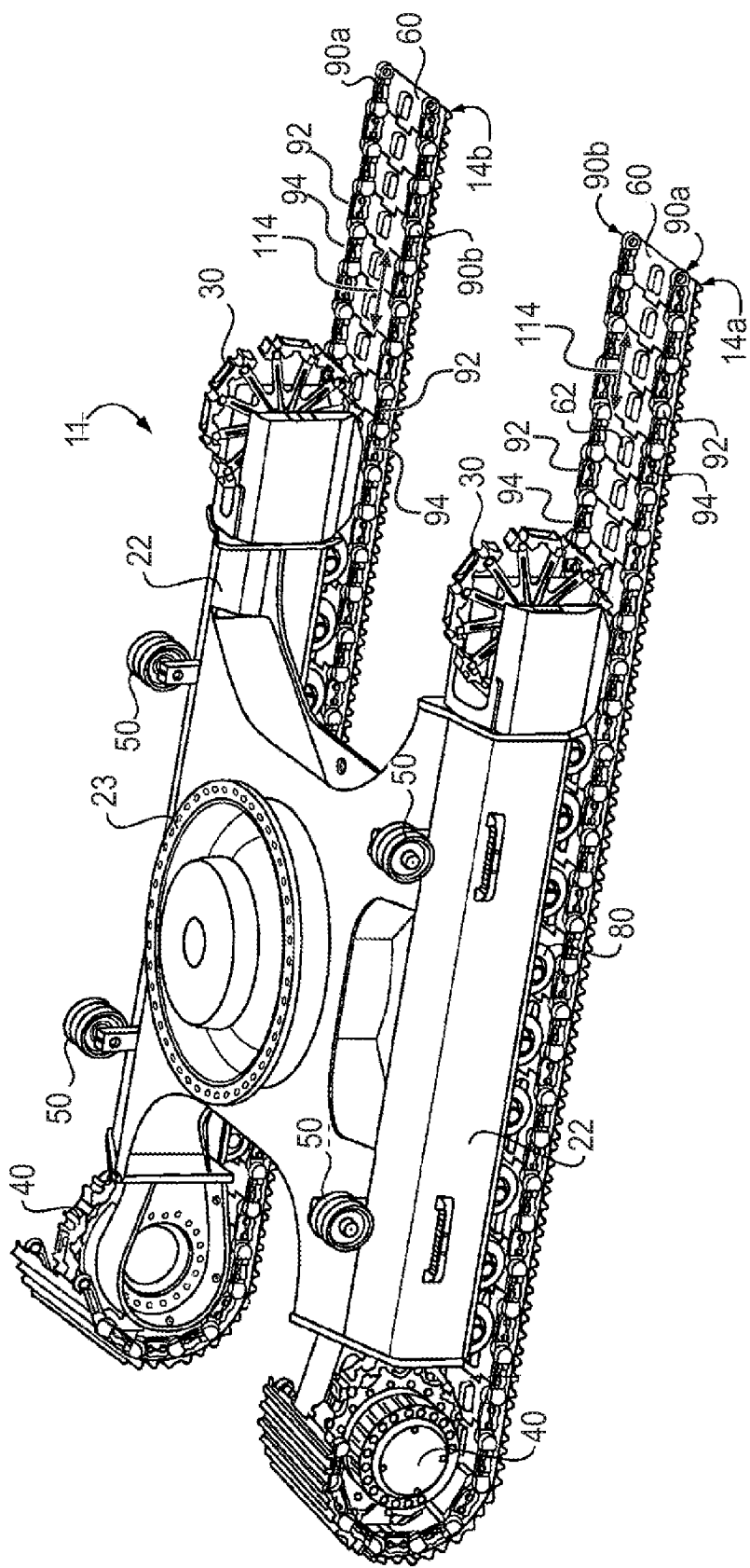
FIG. 2 is a perspective view of a partially disassembled machine undercarriage for the machine of FIG. 1 revealing more clearly the track chain of FIG. 1.
Figure 3:
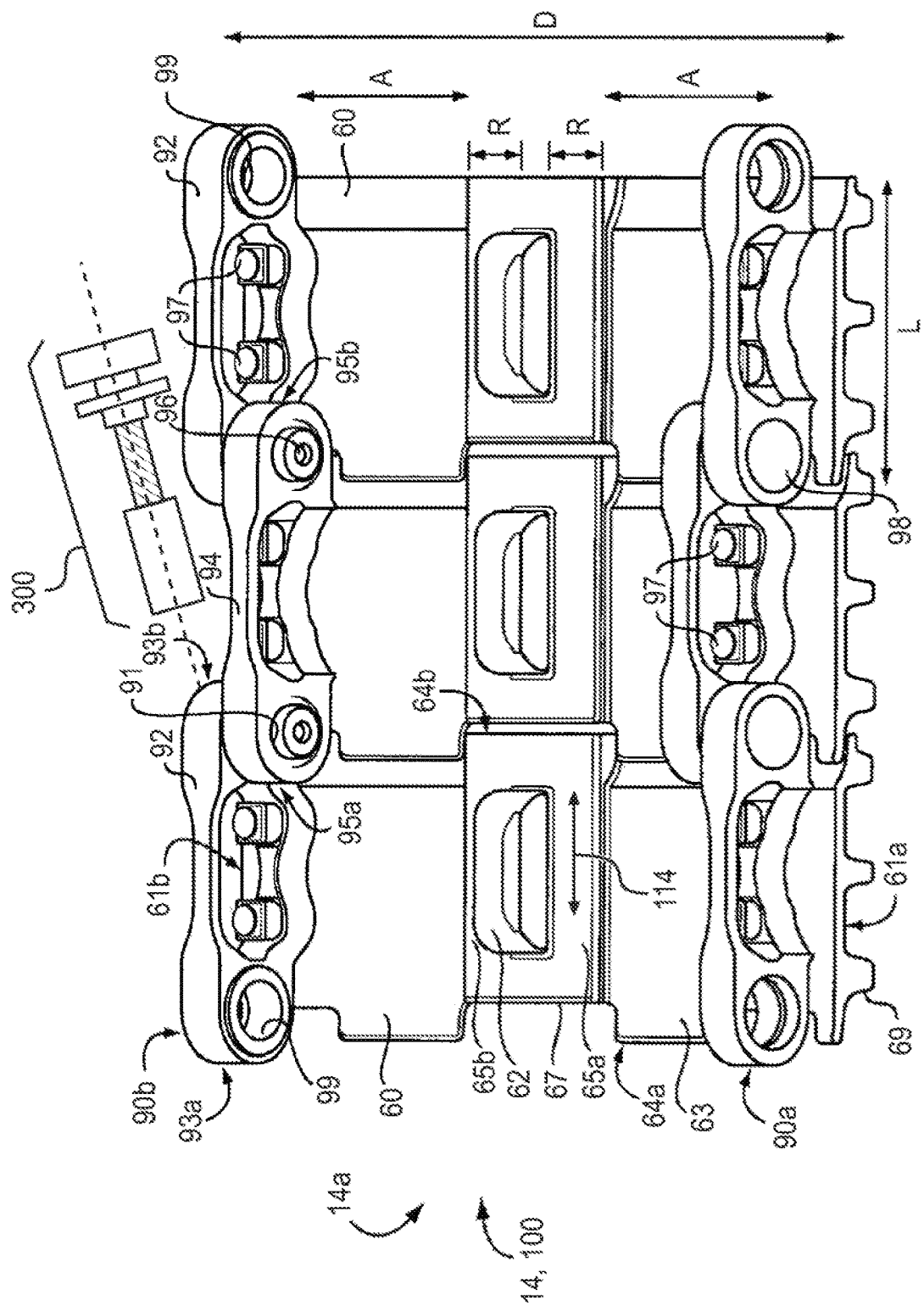
FIG. 3 is a perspective view of a track segment of the track chain of FIG. 2.

FIGS. 1 thru 3 illustrate an application of various embodiments of the pin retention device of the present disclosure.

Referring to FIG. 1, there is shown a machine 10 having a frame 12 with a track system 14, including a first track 14a and a second track 14b positioned at opposite sides of frame 12. Machine 10 is shown in the context of an excavator having an operator cab 16, a linkage 18 and an implement 20 coupled with linkage 18. Tracks 14a and 14b are part of a machine undercarriage 11 coupled with frame 12 in a conventional manner. Each of tracks 14a and 14b include a plurality of coupled together track shoes 60 forming endless loops extending about a plurality of rotatable elements. In a typical design, an idler 30 and a drive sprocket 40 will be associated with each of tracks 14a and 14b and mounted to a track roller frame 22. A plurality of track rollers 80 may also be mounted to roller frame 22, and are associated with each of tracks 14a and 14b to support machine 10 and guide tracks 14a and 14b in desired paths, as further described herein. One or more carrier rollers 50 may also be associated with each of tracks 14a and 14b to support and guide the tracks opposite rollers 80 during operation. The unique design of tracks 14a and 14b and the overall track and undercarriage system of which they are a part are contemplated to enable machine 10 to operate in certain environments such as soft underfoot conditions without the shortcomings associated with many earlier designs. While use in the machine environment of an excavator is emphasized herein, it should be understood that machine 10 might comprise a different type of machine. For instance, track-type tractors or even half-track machines are contemplated herein. Further still, machine 10 might consist of a conveyor or other type of machine wherein tracks are used for purposes other than as ground engaging elements. Also, the machine might be some type of hydraulic shovel or rope shovel.

Referring now also to FIG. 2, there is shown machine undercarriage 11 partially disassembled, showing portions of track roller frame 22 and a carbody 23. Each of tracks 14a and 14b may include a first track chain 90a and a second track chain 90b. In one embodiment, each track chain 90a and 90b may be positioned at or close to opposite edges of each track shoe 60 making up the respective track. Each of track chains 90a and 90b may consist of alternating inboard links 94 and outboard links 92. Referring also to FIG. 3, there is shown a segment of track 14a, representative of any portion thereof, and substantially identical to any segment of track 14b. The segment of track 14a shown in FIG. 3 includes three coupled together track shoes 60, each having one track link of first track chain 90a and one track link of second track chain 90b coupled therewith. Each of the respective track links may be bolted to the corresponding track shoe with bolts 97. In other embodiments, described herein, integral track links and track shoes may be used.

It will further be noted from the FIG. 3 illustration that each track link may include opposite ends positioned adjacent ends of successive track links in the corresponding track chain. In particular, each outboard track link 92 may include a first end 93a and a second end 93b opposite first end 93a. Each inboard link 94 may also include a first end 95a and a second end 95b. The respective track links may be positioned such that their ends are located adjacent ends of adjacent track links in a side-by-side arrangement. Links having their ends arranged in a side-by-side manner could be either straight or S-shaped links, for example. Track pins 96 may extend through adjacent track link ends to couple the track links, and in turn adjacent track shoes, together, regardless if the track links and shoes are integral with each other or separate members. Each of inboard links 94 may include bores 91 in each of ends 95a and 95b wherein a track pin 96 is press fitted. Each outboard link 92 may include another bore 99 in each of its ends 93a and 93b wherein a track pin 96 is loose-fitted. Snap-rings, keepers or some other pin retention mechanism according to an embodiment that will be described herein may be used to inhibit pins 96 from slipping out of bores 99, etc. End caps 98 may be used to seal bores 99 to retain lubricating fluid therein and enable access for service, etc. In one embodiment, links 92 and 94 may be formed with a single forging die, and their respective bores, etc., formed via machining to obtain different sizes for press-fits versus loose fits.

Among other things, the present disclosure provides a track system, one embodiment of which is shown in FIG. 3, which differs from known track designs in that the respective track chains 90a and 90b serve only to couple together the sets of track shoes 60. Also in contrast to earlier designs, the track chains do not include rails upon which track rollers ride. Instead, track rollers 80 ride directly on portions of track shoes 60. This strategy allows track chains 90a and 90b to be relatively simpler and lighter than conventional track chain designs. Track chains 90a and 90b may also be positioned adjacent a first outboard edge 61a and a second outboard edge 61b of each of track shoes 60. Positioning track chains 90a and 90b close to the respective outboard edges 61a and 61b will enable track chains 90a and 90b to inhibit flexing and separating of track shoes 60 during certain operating conditions such as during high vertical loading and in response to certain mechanical stresses. In particular, where one of track shoes 60 is positioned upon a relatively hard supporting object such as a stump or stone, chains 90a and 90b can inhibit separating or creation of gaps between track shoes 60 due to stresses placed thereon, as described above in relation to earlier track designs.

As mentioned above, track rollers 80 ride directly on track shoes 60. Each track shoe 60 may include an upper side 63 having a pad 67 positioned thereon. Pad 67 may include a first rail 65a and a second rail 65b, configured to support a track roller during operation. A guide block 62 may also be adjoined by each pad 67 and may comprise an integral part of, or be positioned upon, each pad 67. Each guide block 62 can provide guiding for track rollers as well as drive surfaces for the corresponding track, as further described herein. Each pad 67 may extend approximately from a front edge 64a of each track shoe 60 to a back edge 64b of the corresponding track shoe. In one embodiment, a pad 67 may be formed integrally with each track shoe 60, such as by casting, forging, etc. Each guide block 62 may also be formed integrally with a pad 67. Integral pad and block elements could be keyed to and bolted on track shoes 60 in certain embodiments. In most versions, each pad 67 will provide a thickened region of wear material for wearing against track rollers. In other embodiments, however, pads 67 need not include a thickened wear region at all. Although pads 67 will typically be rectangular, in other embodiments they might have alternative shapes. Pads 67 will typically have a width defined by outboard edges of rails 65a and 65b which is less than one third a width D of the corresponding track shoe. The term pad should thus be understood to refer generally to a region of each track shoe, or a part or region of a part coupled therewith, which provides rails 65a and 65b for track rollers, without limitation as to shape or construction.

It will be further noted that rails 65a and 65b are positioned outboard of each guide block 62 and positioned inboard of each track chain 90a and 90b. In one embodiment, each of rails 65a and 65b may have a width, shown via arrows R in FIG. 3, which is less than a distance by which the closest outboard track chain 90a, 90b is spaced therefrom. In other words, each of track chains 90a and 90b may be spaced an average distance from rails 65a and 65b, respectively, which is greater than the width R of the corresponding rail. In certain embodiments, track chains 90a and 90b may be spaced an average distance, respectively, from rails 65a and 65b which is more than twice a width of the corresponding rail. The distance whereby track chains 90a and 90b are spaced from rails 65a and 65b is shown in FIG. 3 via arrows A. Also apparent from the FIG. 3 illustration are certain of the relative dimensional characteristics of each track shoe 60. It will be noted that each track shoe 60 has a length, shown via arrow L, which is less than one half its width, shown via arrow D in FIG. 3.

As alluded to above, tracks 14a and 14b are considered to be well suited for work in soft underfoot conditions. To this end, tracks 14a and 14b may be "low ground pressure" tracks, each having track shoes 60 with a relatively large ground contact area for distributing pressure from the weight of machine 10 across a relatively large surface area. Each of track shoes 60 has a footprint defined in part by front and back edges 64a and 64b, and also defined in part by outboard edges 61a and 61b. Each of track shoes 60 may further include a ground contact area that is equal to its footprint, or less than its footprint only to an extent that adjacent track shoes overlap one another. Grousers 69 are associated with each of track shoes 60 and may extend downwardly from a lower side thereof, which is positioned opposite upper side 63.

Though not clearly shown in FIGS. 1 and 2, a pin retention device 300 according to an embodiment of the present disclosure may be located at a front 93a or back portion 93b of the rail portion of the track chain member such as the track shoe 60 of FIG. 3.

FIGS. 4-8 illustrate another configuration of a track chain member 200 in the form of a track shoe 104 with integral link members 106 that use a pin retention device according 300 to an embodiment of the present disclosure. The track chain member 200 may be differently configured and work with a differently configured drive sprocket or idler than what is shown in FIGS. 1-3. In other embodiments, the track chain member may be a track shoe or track link member that are separate from each other such as when the track shoe is attached to the track link member via fastening, etc.

Figure 5:
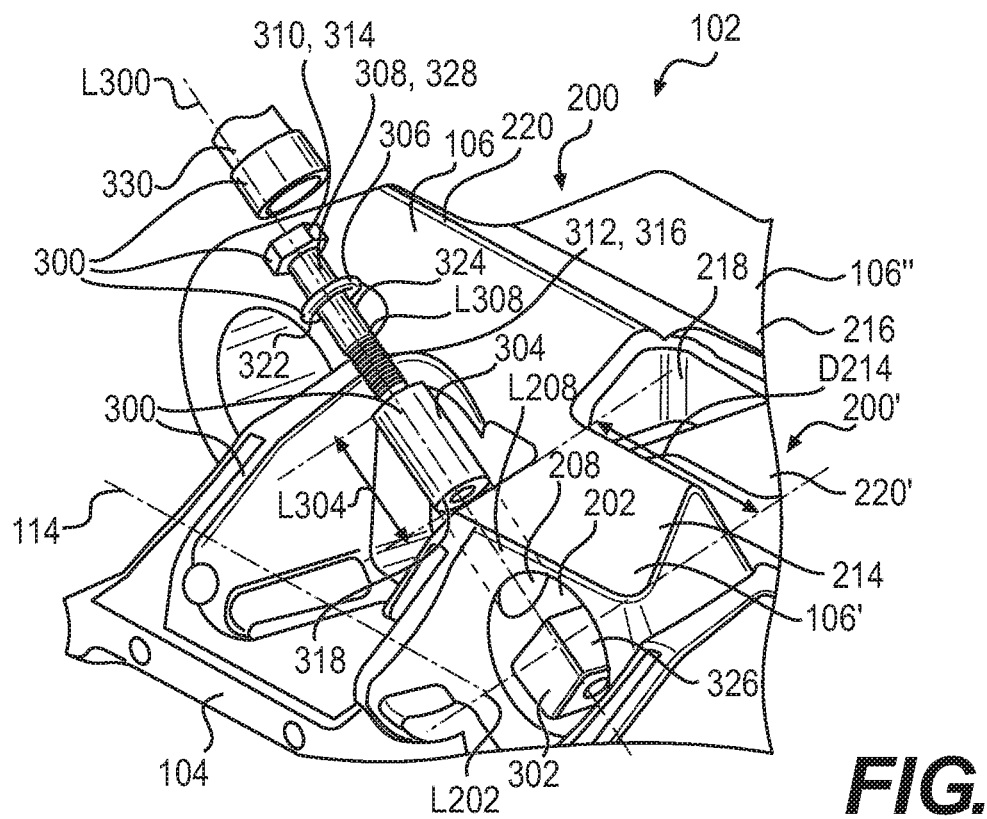
FIG. 5 is a perspective exploded assembly view of a pin retention device according to an embodiment of the present disclosure positioned relative to a track segment.
Figure 6:
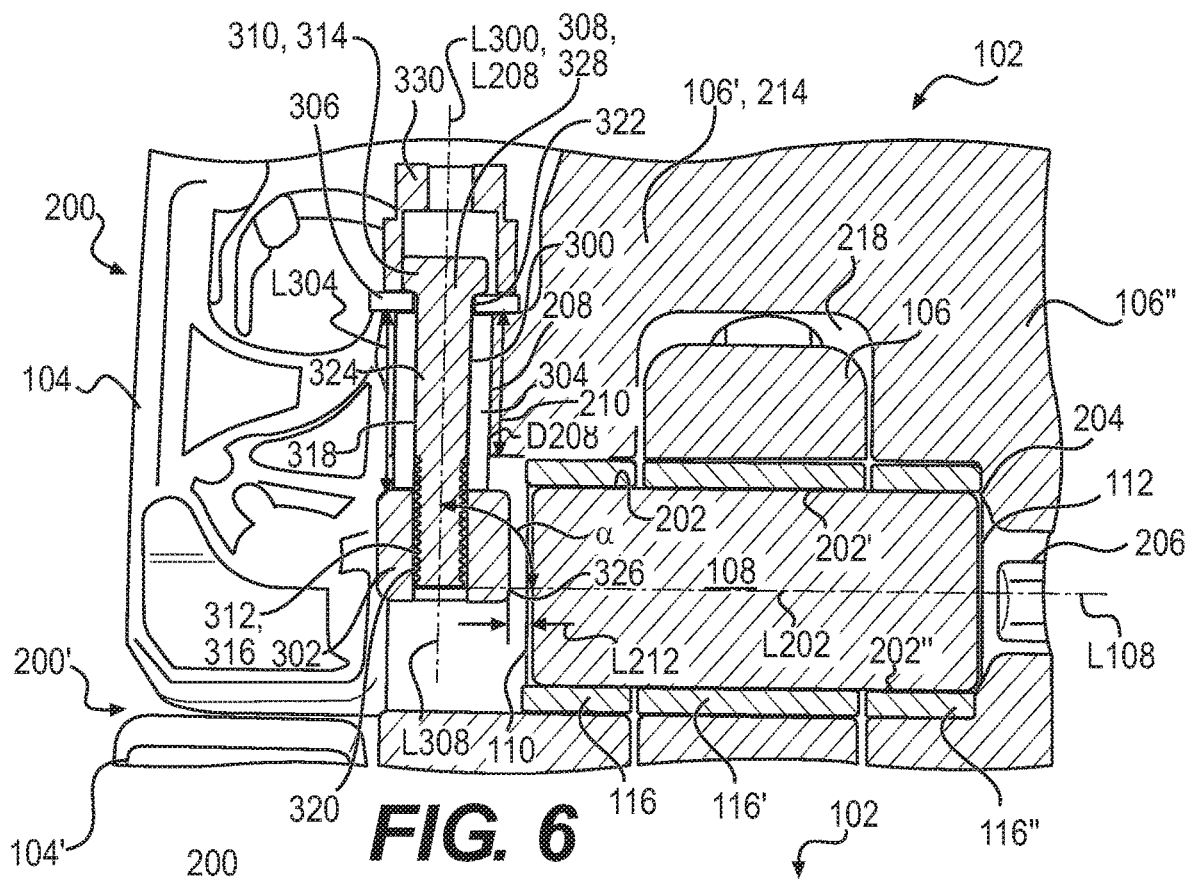
FIGS. 6 and 7 are alternate sectional views showing the pin retention device of FIG. 5 in a configuration where the device is nearly fully installed.
Figure 7:
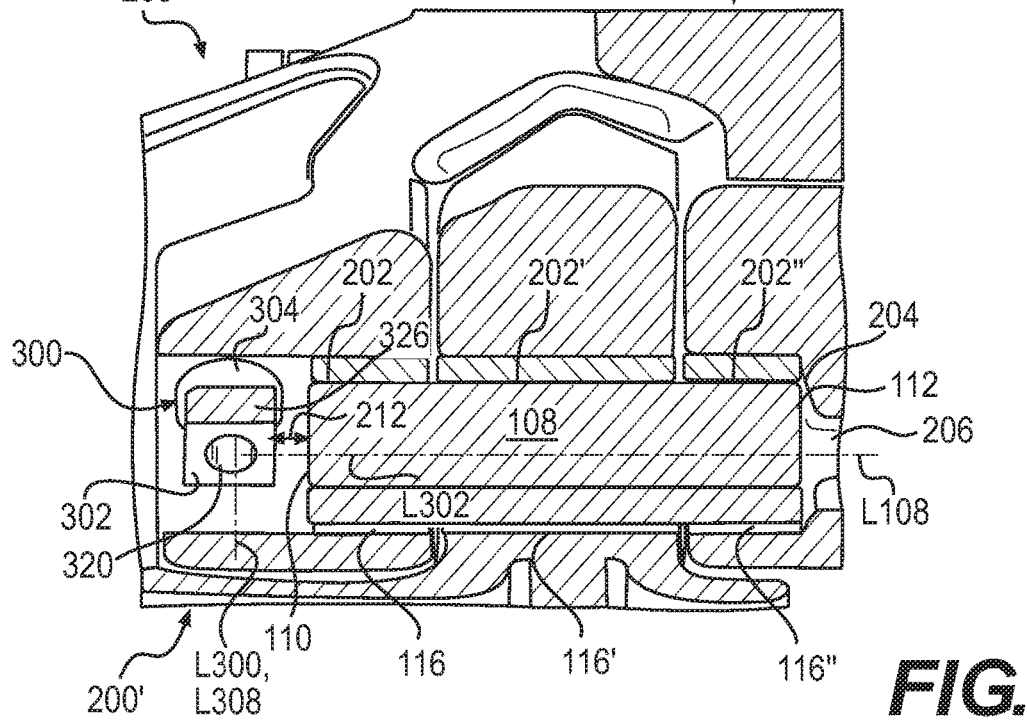

As best seen in FIG. 5-7, a track chain assembly 100 may comprise a plurality of track chain segments 102. A track chain segment 102 typically comprises two track chain members 200 such as shoes and/or links. The track chain members 200 are typically attached to each other via a track pin 108, allowing the track chain members 200 to rotate relative to each other, imparting the track chain assembly 100 with enough flexibility so that the chain may alter its shape from flat, such as when the segment 102 is contacting flat ground, to curved such as when the segment 102 is contacting uneven ground or is winding around a drive sprocket or idler wheel, etc.

Such a track chain assembly 100 often includes a plurality of track chain segments 102 and at least one track chain segment includes two track chain members 200 and a track pin 108. The track pin 108 may be cylindrical defining a longitudinal axis L108, a first end 110 and a second end 112 along the axis L108. The pin 108 may connect the track chain members 200 together by being inserted into track pin bores 202 of the track chain members 200, allowing the track chain members 200 to rotate relative to each other.

As mentioned previously, a pin retention device 300 including a member 302 proximate the first end 110 of the track pin 108 may be provided. The pin retention device 300 may define a longitudinal axis L300 that is non-parallel to the longitudinal axis L108 of the track pin 108.

As best seen in FIGS. 6 and 7, at least one track chain member 200 may define a track pin bore 202 with a shoulder 204 disposed proximate the second end 112 of the track pin 108. In such an embodiment, the at least one track chain member 200 may define an aperture 206 that is at least partially defined by the shoulder 204, and wherein the aperture 206 is in communication with the track pin bore 202.

As best seen in FIG. 6, the longitudinal axis L300 of the pin retention device 300 may make an orthogonal angle α with the longitudinal axis L108 of the track pin 108.

Figure 8:
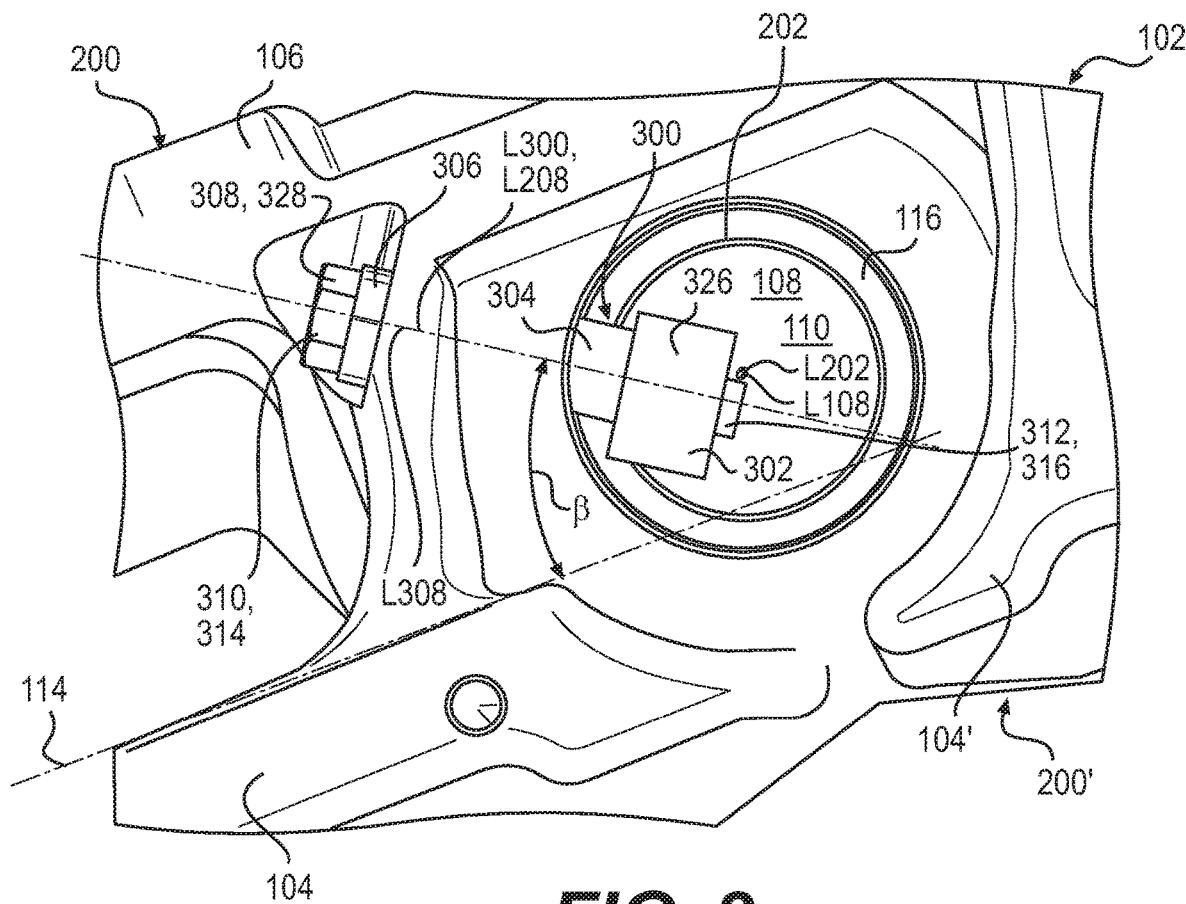
FIG. 8 is an enlarged side view of a track segment of a track chain showing the pin retention device of FIGS. 6 and 7 installed.

Similarly, as best seen in FIG. 8, the track chain member defines a direction of travel 114 and the longitudinal axis L300 of the pin retention device 300 forms an oblique angle β to the direction of travel 114. In such an embodiment, the oblique angle may range from 20 to 50 degrees, and in some cases, may be approximately 35 degrees. This angle may be varied as need or desired.

Referring back to FIG. 6, the pin retention device 300 includes a spacer 304 and the spacer defines a length L304 and at least one track chain member 200 defines a pin retention device bore 208 that defines a thru-depth D208, and the length L304 of the spacer 304 exceeds the thru-depth D208 by a predetermined amount 210. This allows the pin retention device to float within the pin retention device bore along the L300 axis. A washer 306 may also be disposed between the track chain member 200 and the spacer 304, helping to prevent deformation of the track chain member 200 that could lead to a loss of torque on the fastener 308, leading to a loosening and eventual loss of the pin retention device 300. It is contemplated that a washer may be omitted in some circumstances, such as when the washer is incorporated or integral with the head of the fastener or when the head of the fastener is oversized compared to the spacer. That is to say, for example, the diameter of the head is greater than the diameter of the spacer, etc.

As shown in FIGS. 6 and 7, after the track chain segment 102 has been fully assembled, when the track pin 108 is disposed in the track pin bore 202, and the pin retention device 300 is inserted into the pin retention device bore 208, the pin retention device 300 is spaced away from the track pin 108 a predetermined distance 212 when the track pin 108 is fully inserted into the bore 202 such that the pin 108 contacts the shoulder 204 at the opposite end of the bore 202. Thus, the pin may move along the L108 axis before contacting the nut 302 or other member of the pin retention device 300.

Looking at FIGS. 6-8 together, bushings 116 may be provided to provide lubricity or other ways of reducing friction so that the joint formed between the track chain members 200 and the pin 108 may rotate more freely. As shown in FIGS. 6-8, separate bushing members 116, 116', 116" may be disposed in each of the track pin bores 202, 202', 202" or a single bushing member that extends through all the track pin bores may be provided. In yet other embodiments, the bushings may be omitted. For example, a self-lubricating pin may be provided that eliminates the need for bushings in some embodiments, etc.

Referring now to FIGS. 4-8, a track chain member 200 according to an embodiment of the present disclosure may comprise a shoe member 104 and a first rail member 214 extending from the shoe member 104, wherein the rail member 214 defines a dimension D214 of greatest extent and a track chain traveling direction 114 generally parallel to the dimension D214 of greatest extent. The track chain member 200 may further define a track pin bore 202 defining a longitudinal axis L202 that is perpendicular to the track chain traveling direction 114 when the axis L202 and the direction 114 are projected onto the same plane (best seen in FIG. 5), and a pin retention device bore 208 that defines a longitudinal axis L208, wherein the longitudinal axis L208 of the pin retention device bore 208 and the longitudinal axis L202 of the track pin bore 202 are non-parallel (best seen in FIG. 8). As shown in FIGS. 4-8, the shoe member and the rail member may be integral with each other. This may not be true for other embodiments of the present disclosure.

As alluded to earlier with reference to FIG. 6, the longitudinal axis L208 of the pin retention device bore 208 and the longitudinal axis L202 of the track pin bore 202 form a perpendicular angle α with each other. As alluded to earlier with reference to FIG. 8, the longitudinal axis L208 of the pin retention device bore 208 and the track chain traveling direction 114 form an oblique angle β with each other.

Figure 4:
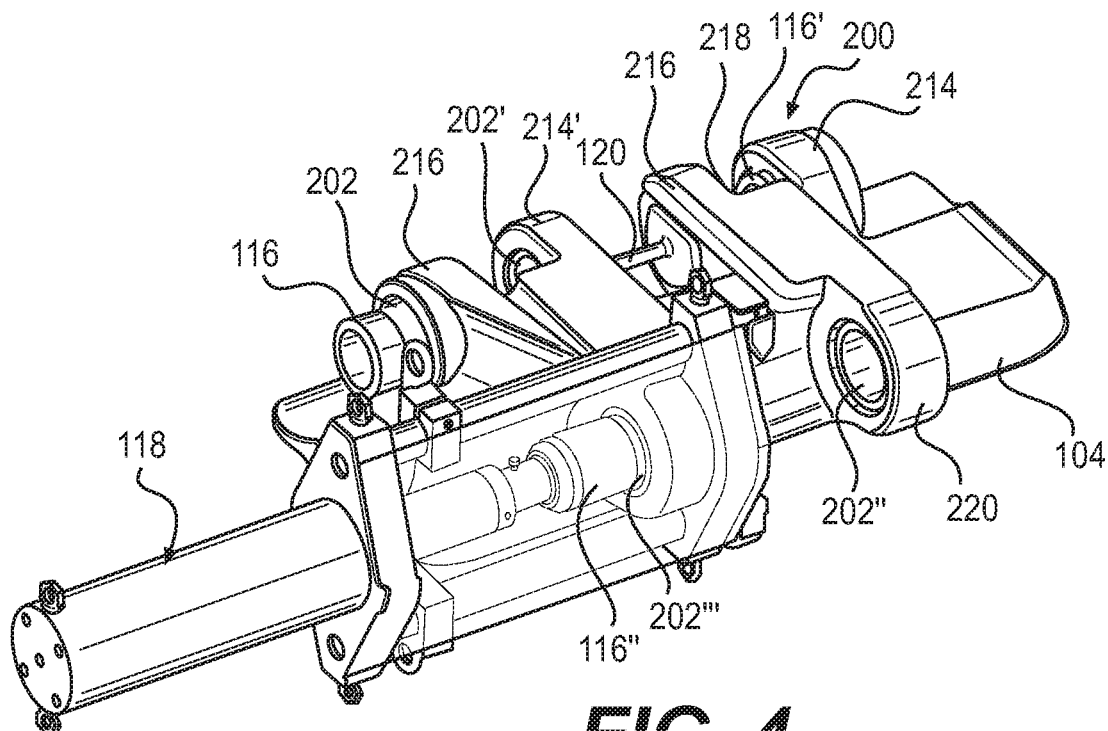
FIG. 4 is a perspective view illustrating the pressing of a track pin bushing into the bores of the track chain members of a track segment using a hydraulic pressing device according to an embodiment of the present disclosure.

Focusing now on FIGS. 4 and 5, the track chain member 200 may further comprise a second rail member 216 extending from the shoe 104 in the same direction as the first rail member 214, defining a pocket 218 between the first and second rail members 214, 216. Also, the track chain member 200 may comprise a third rail member 220 extending in a direction that is opposite the direction the first and second rail members extend 214, 216, the third rail member 220 being aligned with the pocket 218 along the longitudinal axis L202 of the track pin bore 202. In the embodiment shown, the first, second and third rail members 214, 216, 220 form a Y-shaped configuration. More particularly, these rail members may provide a single continuous or uninterrupted Y-shaped flat or planar rail surface that contacts the track rollers as alluded to earlier herein. Other configurations are possible for other embodiments of the present disclosure.

FIGS. 5-8 disclose an embodiment of a pin retention device 300. The device comprises a fastener 308 defining a longitudinal axis L308, a first end 310 and a second end 312 along the longitudinal axis L308, a head 314 at the first end 310 and a threaded portion 316 at the second end 312, a tubular spacer 304 defining a thru-hole 318 configured to receive the fastener 308, and a nut 302 defining a threaded hole 320 configured to mate with the threaded portion 316 of the fastener 308. For reasons set forth above, the device 300 may further comprise a washer 306 that defines a central aperture 322 that is configured to receive the fastener 308.

Looking at the fastener 308 more closely as best seen in FIGS. 5 and 6, the fastener 308 includes a shank portion 324 disposed between the head 314 and the threaded portion 316 and the washer 306 is disposed between the head 314 and the tubular spacer 304 once the device has been fully installed. The nut 302 includes a rectangular configuration that allows the surface area of its flat sides 326 to be maximized so that it provides enough bearing surface area should the pin 108 contact the flat side 326 if the pin become loose. Also, the fastener 308 takes the form of a bolt 328 that includes a hexagonally shaped head 314. A socket 330 may be provided to mate with the head 314 while a wrench may be used to hold the nut 302 still as the bolt 328 is tightened. This continues until the washer 306 is sandwiched between the head 314 of the fastener 308 and the spacer 304. The pin retention device 300 is free to float in the pin retention device bore 208 since the spacer 304 is longer than the depth of the bore 208 as previously explained.

As depicted by FIG. 4, the pin bushings 116 may be pressed into the track pin bores 202 of a track chain member 200 using a hydraulic pressing device 118. A brace 120 may be span between two rail members 214', 216 to provide support so that the rail members do not bend during the pressing operation. Then, the track pins may be inserted into the bores using a similar hydraulic device.

Figure 9:
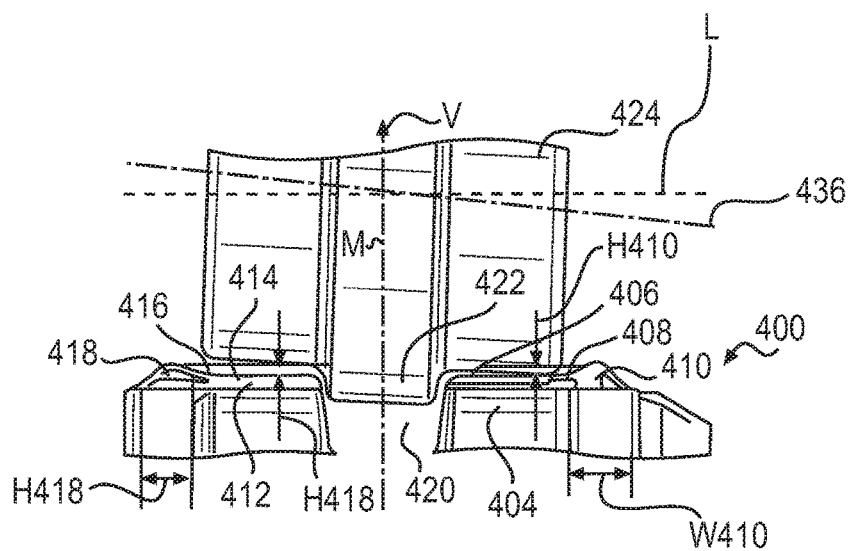
FIG. 9 is a front view of an idler wheel or a track roller riding on a contoured double pass roller path of a track chain member according to an embodiment of the present disclosure.
Figure 10:
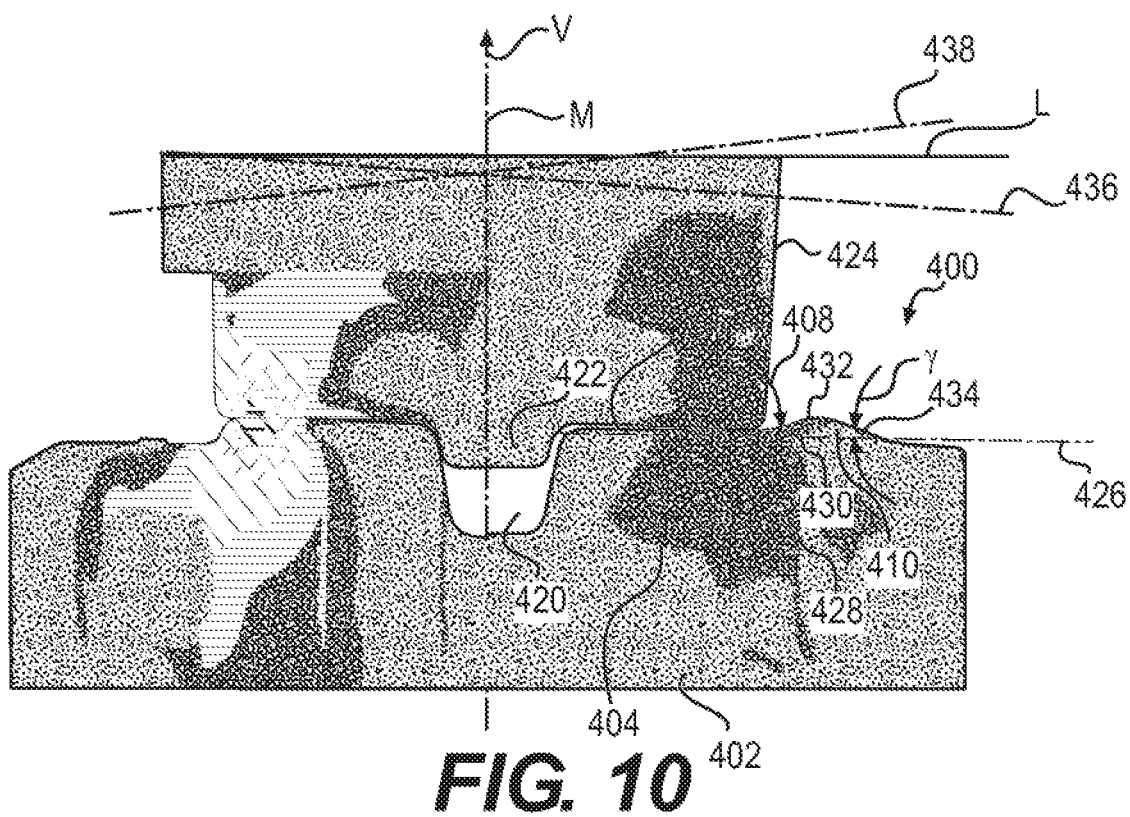
FIG. 10 contains a FEA stress plot showing the reduction of stress using a contoured roller path according to an embodiment of the present disclosure as compared to a conventional design.

Other embodiments of the present disclosure may provide structure to help reduce the spalling or fracturing of track chain members. Referring now to FIGS. 9 and 10, a track chain member 400 may comprise a shoe member 402, and a first rail member 404 extending from the shoe member 402, wherein the first rail member 404 defines a track chain traveling direction 114 (this direction is perpendicular to FIGS. 9 and 10 and is best seen in FIGS. 1-3 and 8) and a lateral direction L generally perpendicular to track chain traveling direction 114. The first rail member 404 may also include a first support surface 406 extending generally in both the track chain traveling direction 114 and the lateral direction L defining an outer lateral extremity 408, and a first crest shaped member 410 disposed laterally adjacent the outer lateral extremity 408 of the first support surface 406. The "outer lateral extremity" is so called as it is closest the outside portion of the track chain member, toward the outside of the machine, once the track chain assembly is mounted on the undercarriage of the machine. The shoe member and any rail member may or may not be integral with each other.

In some embodiments such as the one shown in FIGS. 9 and 10, the shoe member 402 and the first rail member 404 define metallic outer surfaces. Often, the shoe member and the first rail member consist essentially of metallic material such as cast iron, steel, etc.

Focusing now on FIG. 9, the first crest shaped member 410 defines a width W410 along the lateral direction L, a vertical direction V that is perpendicular to the lateral direction L and the track chain traveling direction 114, and a height H410 in the vertical direction V, wherein the width W410 exceeds the height H410. The track chain member 400 may further comprise a second rail member 412 extending from the shoe member 402, wherein the second rail member 412 defines a track chain traveling direction 114 and a lateral direction L generally perpendicular to track chain traveling direction 114. The track chain member 400 may further define a second support surface 414 extending generally in both the track chain traveling direction 114 and the lateral direction L defining an inner lateral extremity 416 and a second crest shaped member 418 disposed laterally adjacent the inner lateral extremity 416 of the second support surface 414. The "inner lateral extremity" is so called as it is closest the inside portion of the track chain member, toward the inside of the machine, once the track chain assembly is mounted on the undercarriage of the machine.

The second crest shaped member 418 may define a width W418 along the lateral direction L, a vertical direction V that is perpendicular to the lateral direction L and the track chain traveling direction 114, and a height H418 in the vertical direction V, wherein the width W418 exceeds the height H418.

Width W410 and W418 may range from 40 to 200 mm. Likewise, height H410 and H418 may range from 40 to 200 mm. Also, the second support surface 414 defines a second support surface width W414 along the lateral direction L and the ratio of the height H418 of the second crest shaped member 418 to the second support surface width W414 ranges from 1:1 to 1:3. These dimensions may be varied as needed or desired in other embodiments.

It should be noted that the track chain member 400 of the embodiment shown in FIGS. 9 and 10, as well as other figures of the present disclosure, may have features that are substantially symmetrical about a midplane M located halfway between the rail members 404, 412. One difference that features may be rotated about the midplane as will be discussed later herein. The features of the rail members 404, 412 including the crest shaped members 410, 418 may be symmetrical and/or have similar or the same dimensions, etc.

As mentioned earlier herein, a track chain assembly 100 may be provided comprising a plurality of track chain segments 102. The plurality of track chain segments may include at least one track chain segment that includes two track chain members 400 wherein at least one track chain member 400 includes a shoe member 402 and a first rail member 404 extending from the shoe member 402. The first rail member 404 defines a track chain traveling direction 114 and a lateral direction L perpendicular to track chain traveling direction 114, a first support surface 406 extending generally in both the track chain traveling direction 114 and the lateral direction L defining an outer lateral extremity 408, and a first crest shaped member 410 disposed laterally adjacent the outer lateral extremity 408 of the first support surface 406.

The same track chain member 400 may also include a second rail member 412 extending from the shoe member 402, wherein the second rail member 412 defines the same track chain traveling direction 114 as the first rail member 404 and the same lateral direction L as the first rail member 404, a second support surface 414 extending generally in both the track chain traveling direction 114 and the lateral direction L defining an inner lateral extremity 416, and a second crest shaped member 418 disposed laterally adjacent the inner lateral extremity 416 of the second support surface 414. The first rail member 404 is spaced away from the second rail member 412, defining a groove 420 therebetween. This groove 420 is configured to receive the guiding ridge 422 of an idler wheel or track roller 424 or the like, helping to keep the track on the undercarriage.

As can be seen by looking at FIG. 9, the first and second support surfaces 406, 414 are coplanar. This may not be the case in other embodiments. As mentioned previously, the track chain member 400 defines a midplane M and the first and second crest shaped members 410, 418 are symmetrically shaped about the midplane M for this embodiment. This may not be true in other embodiments.

Referring back to FIG. 10, the track chain member 400 further defines a concave arcuate surface 426 such as a radius joining the first support surface 406 to the first crest shaped member 410. More specifically, the first crest shaped member 410 defines a first angled surface 428 forming a first oblique angle φ with the lateral direction L and the concave arcuate surface 426 joins the first support surface 406 with the first angled surface 428. Similarly, the first crest shaped member 410 defines a convex arcuate surface 430 such as a radius near the zenith of the first crest shaped member 410. The first crest shaped member 410 defines a straight surface 432 near the zenith. Alternatively, the convex arcuate surface 430 may define the zenith without any straight surface. Also, the first crest shaped member 410 defines a second angled surface 434 on the opposite lateral side of the first crest shaped member 410 as compared to the first angled surface 428, wherein the second angled surface 434 forms a second oblique angle γ with the lateral direction L. Although not pointed out in the figures, another convex arcuate shape may blend the top straight surface 432 to the second angled surface 434.

It is contemplated that the various dimensions of the first crest member 410 may be varied as needed or desired. For example, the first oblique angle φ may range from 1 to 30 degrees. Likewise, the second oblique angle γ may range from 0 to 180. The second oblique angle may be greater than the first oblique angle as shown in FIGS. 9 and 10. This may not be the case in other embodiments. Any of these dimensions may be varied as needed or desired in other embodiments.

Figure 11:
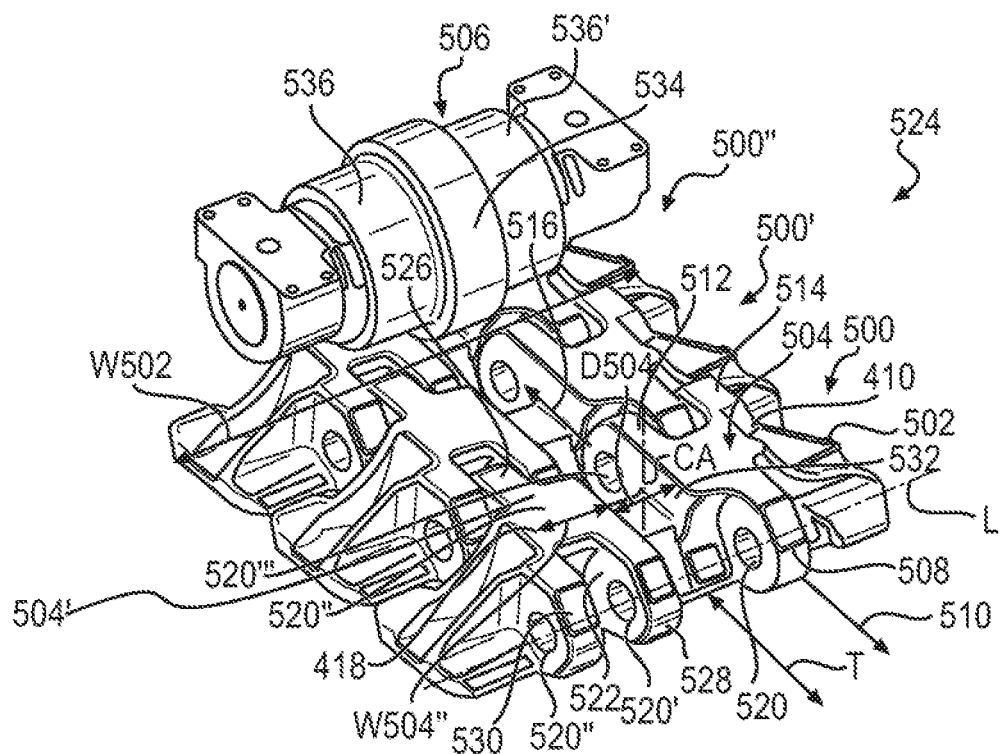
FIG. 11 is a perspective view of a track roller riding on several track chain members with track pads according to an embodiment of the present disclosure with increased contact surface area as compared to previous designs.
Figure 12:
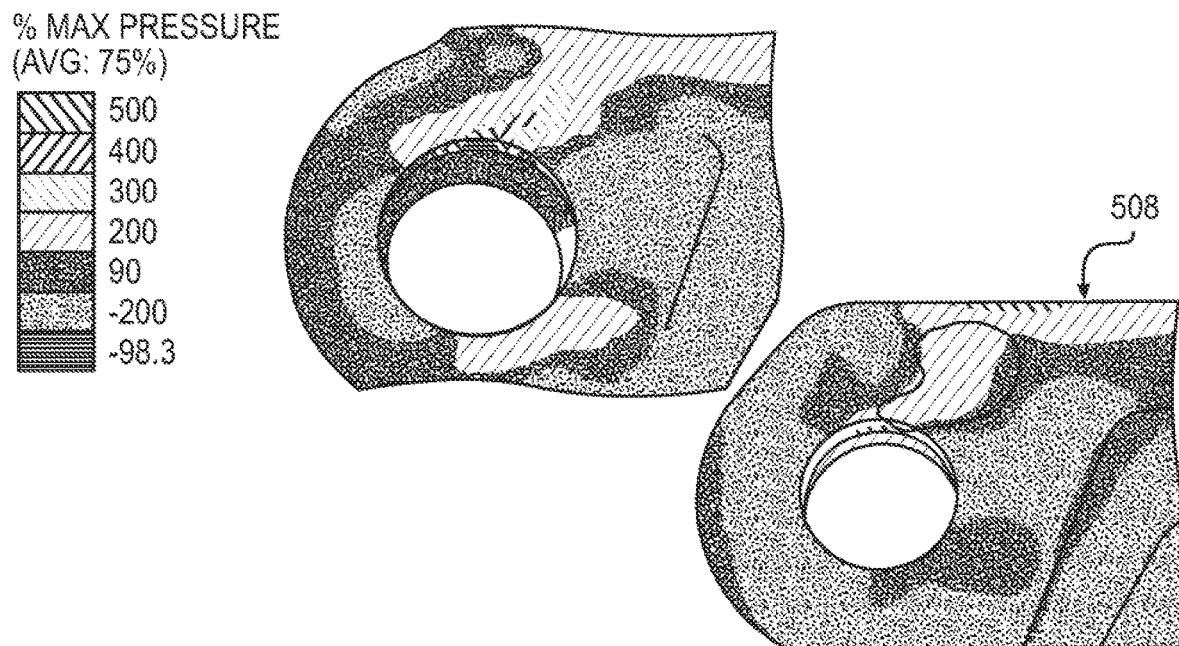
FIG. 12 contains a FEA stress plot showing the reduction of stress near the track pin bore by increased the width of the track lug-strap of the track chain member of FIG. 11 compared to a previous design.
Figure 13:
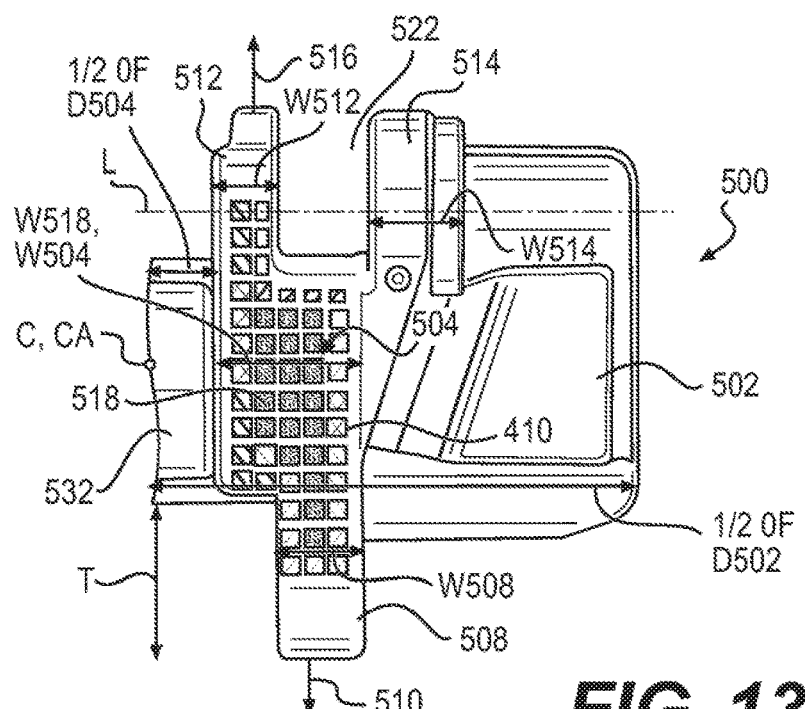
FIG. 13 is a top view of the track pad of track chain member according to the embodiment of FIG. 11, depicting the stress on the support surface of the track pad using a FEA plot.

FIGS. 11-14 illustrate an embodiment of a roller path of a track pad that may reduce the likelihood of fracturing or spalling when the track chain or track chain member is subjected to heavy loads during use. As best illustrated by FIGS. 11 and 13, a track chain member 500 according to an embodiment of the present disclosure may comprise a shoe member 502 defining a track chain traveling direction T and a lateral direction L perpendicular to the track chain traveling direction T, and a track pad member 504 extending from the shoe member 502 that is configured to support the weight of the machine as it is transferred to the track pad member 504 through a track roller 506 or the like. The track pad member 504 may include a first lug member 508 extending from the shoe member 502 in a first direction 510 parallel to the track chain traveling direction T, a second lug member 512 and a third lug member 514 both extending from the shoe member 502 in a second direction opposite 516 of the first direction 510.

As alluded to earlier herein, the first, second and third lug members 508, 512, 514 define a Y-shaped configuration and the first lug 508 defines a first lug width W508 along the lateral direction L. Focusing on FIG. 13, the first track pad member 504 defines a roller support surface 518 defining a roller support surface width W518 along the lateral direction L and the first lug width W508 ranges from 40-60% of the roller support surface width W518. Looking at FIG. 11, the first, second and third lugs 508, 512, 514 define track pin bores 520 for receiving a track pin. The various dimensions and ratios may be varied as needed or desired. For example, the first lug width W508 may range from 96 to 106 mm while the roller support surface width W518 may range from 191 to 211 mm. Referring back to FIG. 13, the second lug member 512 is spaced away from the third lug member 514, defining at least partially a void 522 therebetween and the first lug member 508 is laterally aligned with the void 522.

Looking at both FIGS. 11 and 13, this arrangement allows the first lug member 508 to be inserted into the void 522 when assembling a track chain assembly 524 using similarly configured track chain members 500 so that the track pin may be inserted through the track pin bore 520 of the second or third lug member 512, 514 into the track pin bore 520 of the first lug member and the track pin bore 520 of the other of the second or third lug member 512, 514, forming a rotating joint. All the track pin bores 520 may have substantially the same diameters when clearance and manufacturing tolerances are taken into consideration. This configuration or features may not be present or may be varied in scope in other embodiments.

Referring back to FIG. 13, the second lug member 512 defines a second lug member width W512 along the lateral direction L, the third lug member 514 defines a third lug member width W514 along the lateral direction L, and the first lug member width W508 is different than the second lug member width W512 and the third lug member width W514. This may not be true for other embodiments. Similarly, the first lug member width W508 is greater than the second lug member width W512 but less than the third lug member width W514. This may not be the case in other embodiments.

The track chain member 500 may define a center of mass C and a central axis CA passing through the center mass C wherein the central axis is perpendicular to the lateral direction L and the track chain traveling direction T. The geometry of the track chain member 500 may be described as including a circular array wherein the first, second and third lug members 508, 512, 514 are rotated about the central axis 180 degrees, forming fourth, fifth and sixth lug members 526, 528, 530 respectively. The track chain member may further define a central groove 532 located at the central axis CA wherein the central groove 532 extends generally in the track chain traveling direction T. This feature may allow the guide ridge 534 of a track roller 506 or the like to ride therein, helping to prevent the track chain assembly 524 from falling off the undercarriage of a machine. The support surface 518 of the track pad may have a width W518 corresponding with that of a portion 536 of the roller 506 so that the contact surface between the track roller and the track pad is maximized to reduce the stress exerted on the track pad.

With continued reference to FIGS. 11 and 13, a track chain assembly 524 according to an embodiment of the present disclosure may be provided. The track chain assembly 524 may comprise a plurality of interlocking track chain members 500 wherein each track chain member 500 defines a track chain traveling direction T and a lateral direction L perpendicular to the track chain traveling direction T. Each of the interlocking track chain members 500 may include a shoe member 502 defining a shoe width W502 along the lateral direction L, a first track pad member 504 defining a first track pad maximum width W504 along the lateral direction L, and a second track pad member 504' defining a second maximum track pad width W504' along the lateral direction L. The ratio of either the first or second track pad maximum widths W504, W504' to the shoe member width W502 may range from 1:4 to 3:4.

Focusing on FIG. 11, the first track pad member 504 is spaced away from the second track pad member 504' a predetermined distance D504 along the lateral direction L. As already discussed earlier herein, both the first track pad member 504 and the second track pad member 504' include a first lug member 504 extending from the shoe member 502 in a first direction 510 generally parallel to the track chain traveling direction T, and a second lug member 512 and a third lug member 514 both extending from the shoe member 502 in a second direction 516 opposite of the first direction 510. The first lug member 508 defines a first lug member width W508 along the lateral direction L and the first lug member width W508 ranges from 40-60% of either the first or second maximum track pad widths W504, W504'. Any of these dimensions may be varied as needed or desired in other embodiments.

Figure 15:
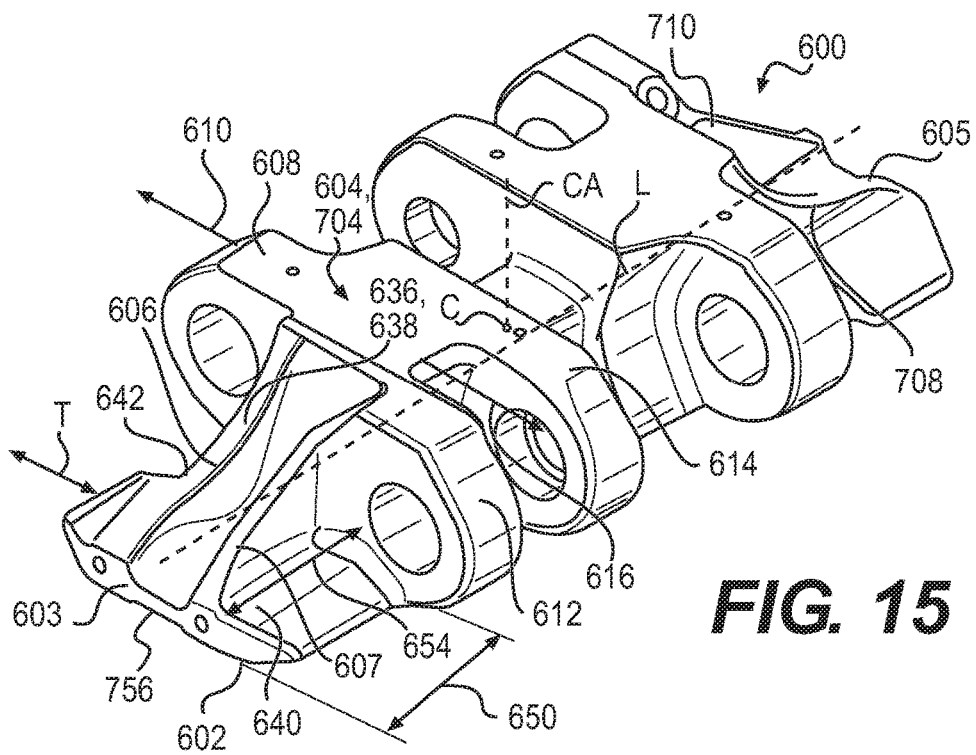
FIG. 15 is a perspective view of a track chain member including curved ribs according to an embodiment of the present disclosure.
Figure 16:
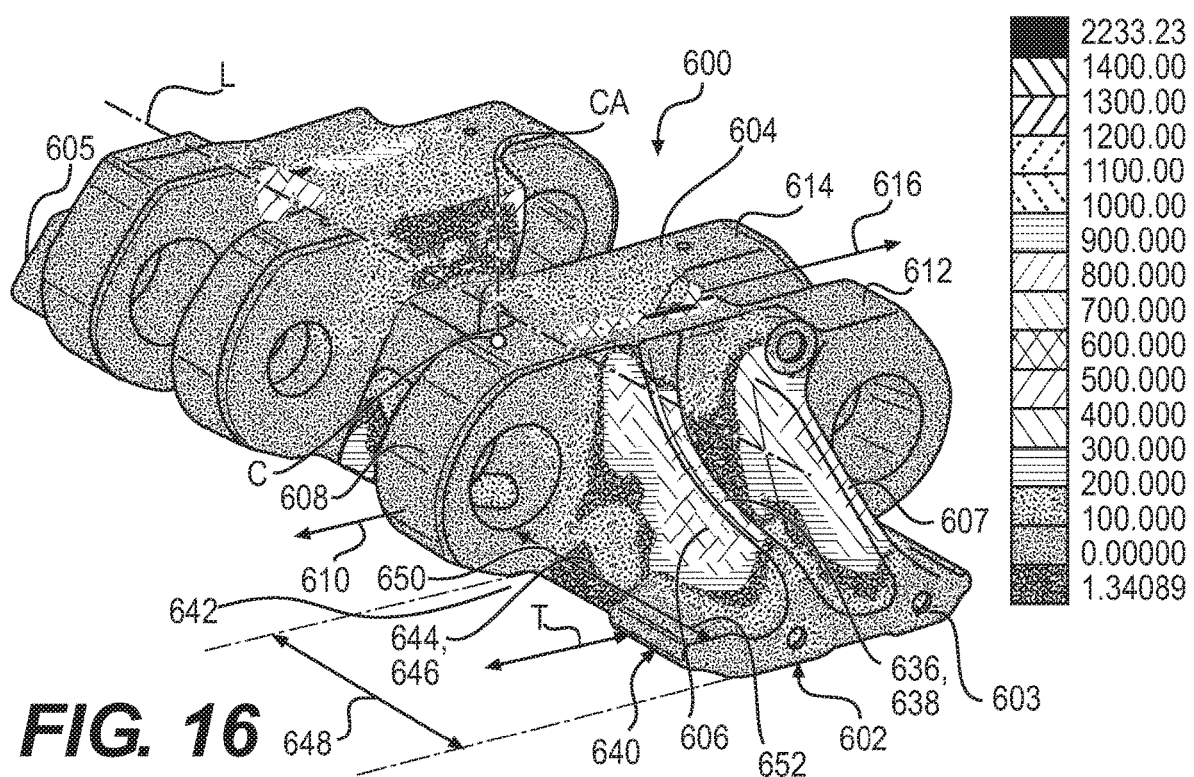
FIG. 16 is a FEA stress plot of the track chain member of FIG. 15 shown in an alternate perspective view while loaded, indicating a reduction in stress as compared to previous track chain member designs.

Referring now to FIGS. 15 and 16, a track chain member according to another embodiment of the present disclosure is shown and will now be described. The track chain member 600 may comprise a shoe member 602 defining a track chain traveling direction T and a lateral direction L perpendicular to the track chain traveling direction T while also defining a first lateral end 603 and a second lateral end 605 of the shoe member 602. The track chain member 600 also comprises a first track pad member 604 extending from the shoe member 602 including a first lug member 608 extending from the shoe member 602 in a first direction 610 parallel to the track chain traveling direction T, a second lug member 612 and a third lug member 614 both extending from the shoe member 602 in a second direction 616 opposite of the first direction 610. This arrangement of the first, second and third lug members 608, 612, 614 define a Y-shaped configuration.

The track chain member 600 further includes a first rib 606 disposed nearest the first lug member 608 along the track chain traveling direction T extending from the first track pad member 604 along the lateral direction L substantially to the first lateral end 603 of the shoe member 600. The first rib 606 may define a first concave radial portion 636. Also, the track chain member 600 may include a second rib 607 disposed nearest the second lug member 612 along the track chain traveling direction T extending from the track pad member 604 along the lateral direction L substantially to the first lateral end 603 of the shoe member 602.

In some embodiments, the first concave radial portion 636 defines a radius 638 ranging from 50 to 900 mm. This value may be varied as needed or desired in other embodiments.

As best seen in FIG. 16, the shoe member 602 may include a ground engaging portion 640 disposed proximate the first lateral end 603, and the shoe member 602 may define a notch 642 bounded by the first lug member 608, the first rib 606 and ground engaging portion 640 disposed proximate the first lateral end 603. In some embodiments, the track chain member 600 may further comprise a transitional surface 644 that at least partially defines the notch 642, wherein the transitional surface 644 is bounded by the first lug member 608, the ground engaging portion 640 and the first rib 606. The transitional surface 644 may include a radial portion 646, a slope portion, etc. This surface may provide clearance so that the second lug member of a similar track chain member may fit into the notch when assembly a track chain assembly.

Looking at both FIGS. 15 and 16, the ground engaging portion 640 may extend from the first lug member 608 and the second lug member 612 to the first lateral end 603, the first lug member 608 may be spaced away from the first lateral end 603 a first lateral distance 648, the second lug member 612 is spaced away from the first lateral end 603 a second lateral distance 650, and the first rib 606 extends from the first lug member 608 to the ground engaging portion 640 of the shoe member 602 a first rib lateral distance 652 that is 90 to 100% the value of the first lateral distance 648. Similarly, the second rib 607 extends from the second lug member 612 to the ground engaging portion 640 of the shoe member 602 a second rib lateral distance 654 that is 90 to 100% the value of the first lateral distance 648. These distances may be varied as needed or desired. In many embodiments, the overlap of these distances may be substantial, that is to say, the overlap is 75% or greater.

A similar description may be made regarding the heights of the ribs 606, 607 to the height of the track pad measured in the vertical direction of the track chain member. As shown in FIGS. 15 and 16, the first rib 606 may range from 90 to 100% of the height of the track pad 604 while the second rib 607 may range from 75 to 100% of the track pad 604. Again, these dimensions may be varied as needed or desired in other embodiments.

As discussed earlier herein, a track chain assembly 100 (see FIG. 1) may be assembled by interlocking a plurality of track chain members 600 that are similarly or identically configured such as using a series of track chain members 600 as shown in FIGS. 15 and 16. Other configured track chain members such as master links and the like may also be attached to the plurality of identically or similarly configured track chain members.

Furthermore, as can be appreciated in view of FIGS. 15, 16, 19 and 22 each of the plurality of track chain members 600 may define a center of mass C and a central axis CA passing through the center of mass C wherein the central axis CA is perpendicular to the lateral direction L and the track chain traveling direction T and the track chain member 600 may include a circular array wherein the first, second and third lug members 608, 612, 614 may be rotated about the central axis 180 degrees, forming fourth, fifth and sixth lug members 626, 628, 630. Other features such as the first rib 606, second rib 607, notch 642, and ground engaging portion 640 may also be rotated as part of the array, etc.

Focusing now on FIGS. 19 and 22, various features of the track chain member that allow a more consistent thickness will be discussed. As shown, the track chain member 600 may comprise a shoe member 602 defining a track chain traveling direction T and a lateral direction L perpendicular to the track chain traveling direction T. The shoe member 602 may further define a first lateral end 603, a second lateral end 605, and a ground engaging surface 740 spanning from the first lateral end 603 to the second lateral end 605. The shoe member 602 may further define a first side void 756 proximate the first lateral end 603, and a second side void 758 proximate the second lateral end 605, and the first side void 758 terminates a first predetermined distance 760 from the first lateral end 603 and the second side void 758 terminates a second predetermined distance 762 from the second lateral end 605. More specifically, the ground engaging surface may define the first and second side voids. Thus, the first and second side voids are not encapsulated in the shoe member. This may not be the case in other embodiments.

In addition, the shoe member 602 may further define a main central void 764 that is centered along the lateral direction L of shoe member with respect to the first and the second lateral ends 603, 605. The track chain member 600 wherein the shoe member 602 further define a first auxiliary void 766 in communication with the main central void 764 and the main central void 764 defines a first side end 768 and the first auxiliary void 766 is positioned proximate the first side end 768 of the main central void 764. The shoe member 602 may further define a second auxiliary void 770 in communication with the main central void 764 and the second auxiliary void 770 is positioned proximate the second side end 772 of the main central void 764. Again, the main central void may be defined by the ground engaging surface so that the void is not encapsulated in the shoe member. As pointed out in FIG. 19, the side surfaces 768, 772 of the main central void may form an oblique angle with respect to the lateral direction L or the track chain traveling direction T. As best seen in FIG. 22, the main central void 764 may define a main central void depth D764 in a direction CA perpendicular to the ground engaging surface 740, the first auxiliary void 766 may define a first auxiliary void depth D766 in a direction CA perpendicular to the ground engaging surface 740, and the second auxiliary void 770 defines a second auxiliary void depth D770 in a direction CA perpendicular to the ground engaging surface 740, and the first and second auxiliary void depths D766, D770 are greater than the main central void depth D764. In some embodiments, these depths may be the same.

Figure 19:
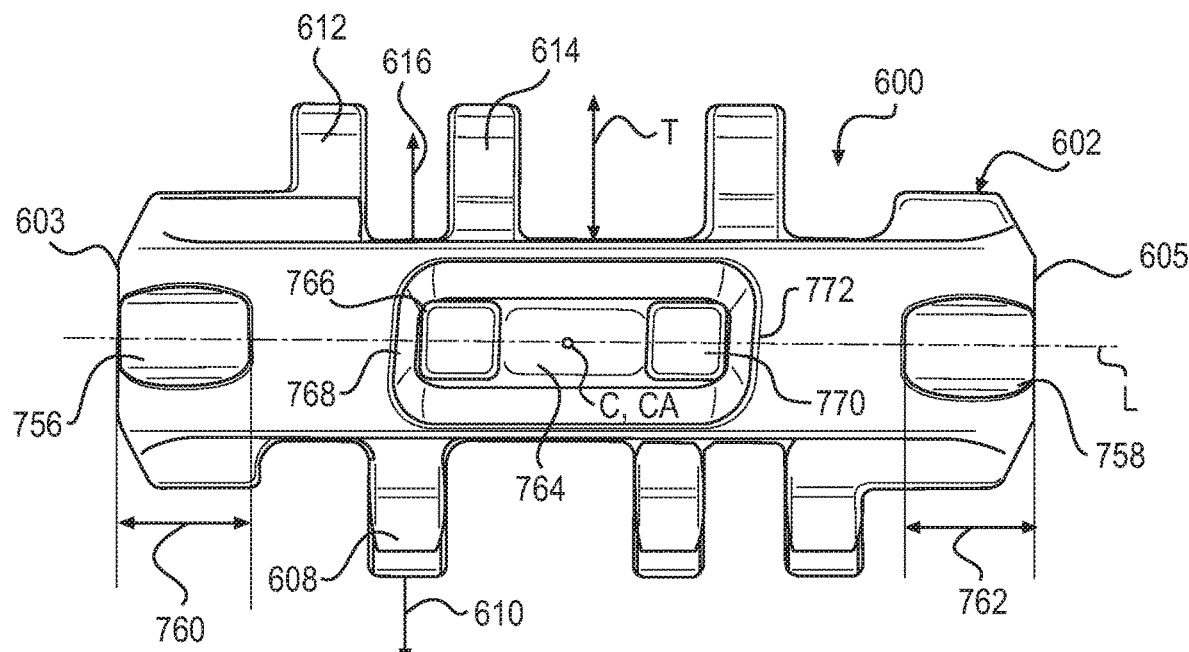
FIG. 19 is a bottom view of the track chain member of FIG. 15, showing voids providing in the bottom of the shoe member.
Figure 22:
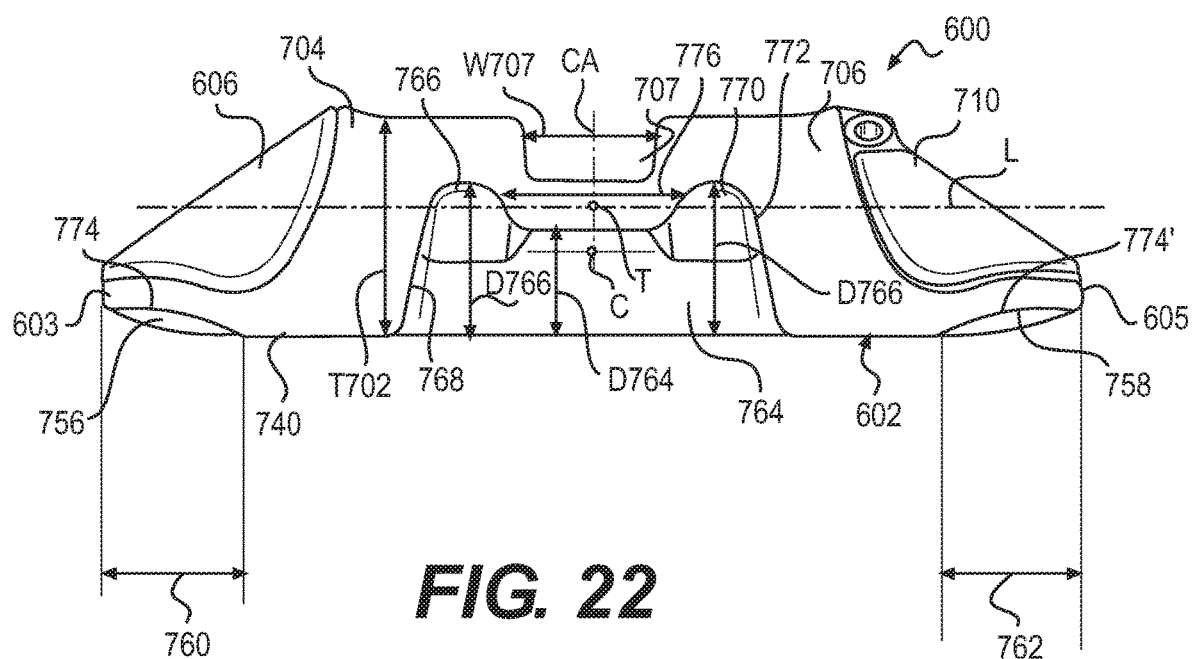
FIG. 22 is a cross-sectional view of the track chain member of FIG. 15 taken along lines 15-15 thereof, depicting the shape of the side and central voids of the shoe member.

As discussed earlier herein, a track chain assembly 100 (see FIG. 1) may be assembled by interlocking a plurality of track chain members 600 that are similarly or identically configured such as using a series of track chain members 600 as shown in FIGS. 19 and 22. Other configured track chain members such as master links and the like may also be attached to the plurality of identically or similarly configured track chain members.

Focusing again on FIG. 22, the track chain assembly may comprise a plurality of interlocking track chain members 600 wherein each track chain member 600 defines a track chain traveling direction T, a lateral direction L perpendicular to the track chain traveling direction T, and includes a shoe member 602 defining a first lateral end 603, a second lateral end 605, and a ground engaging surface 740 spanning from the first lateral end 603 to the second lateral end 605. As depicted, a first rail member 704 may extend from the shoe member 602 disposed proximate the first lateral end 605, and a second rail member 706 extending from the shoe member 602 disposed proximate the second lateral end 605 spaced away from the first rail member 704, defining a central groove 707 therebetween.

Referring to FIGS. 15 and 22, the track chain member 600 may include a first rib 606 and a second rib 607 extending between the first rail member 704 and the first lateral end 603 of the shoe member 602. Similarly, there may be a third rib 708 and a fourth rib 710 extending between the second rail member 706 and the second lateral end 705 of the shoe member 602.

Looking at FIG. 22, the main central void 764 defined by the ground engaging surface 740 of the shoe member 602 disposed beneath the central grove 707 along a direction perpendicular to the ground engaging surface 740. The first side void 756 proximate the first lateral end 603 is bounded by the ground engaging surface 740 and is spaced away from the main central void 764 and a second side void 758 proximate the second lateral end 605 bounded by the ground engaging surface 740 spaced away from the central void 764. The first side void 756 is bounded on either side along the track chain traveling direction T by the first rib 606 and the second rib 607. That is to say, the first side void does not extend further along the track chain traveling direction than any portion of the first or second rib. Likewise, the second side void 758 is bounded on either side along the track chain traveling direction T by the third rib 708 and the fourth rib 710.

For this particular embodiment, the shoe member 602 defines a first curved surface 774 at the bottom of the first side void 756 and a second curved surface 774' at the bottom of the second side void 758. This may not be the case in other embodiments. The central groove 707 defines a width W707 along the lateral direction L and the first auxiliary void 766 and the second auxiliary void 770 are spaced away from each other a distance 776 along the lateral direction L that is greater than the width W707 of the central groove 707.

FIG. 22 illustrates that track chain member 600 defines a cross-section taken along the lateral direction L centered on the shoe member 602 along the track chain traveling direction T and a thickness T702 measured along a direction CA perpendicular to the ground engaging surface 740 that varies along the lateral direction L. For this embodiment, the thickness T702 is greatest in the areas disposed between either the first side void 774 and the main central void 764 or the second side void 758 and the main central void 764.

INDUSTRIAL APPLICABILITY

In practice, a track chain assembly, track chain member and/or pin retention device may be sold, manufactured, bought etc. and attached to the machine in the aftermarket or original equipment scenarios according to any of the embodiments discussed herein. That is to say, the machine may be sold with the track chain assembly, track chain member and/or pin retention device according to embodiments described herein or the machine may be retrofitted, repaired, refurbished to use any of the embodiments discussed herein. The various components including, but not limited to the track chain members, may be used from any suitable material such as cast iron, grey cast iron, steel, etc.

In one particular application, it has been determined that a M36 bolt may be used as the fastener for the pin retention device. In such an application, the bolt may be tighten using 2400 NM or more of torque and the resulting connection may experience no loosening during a period of 20,000 hours of track operation. The device may also withstand 490 kN of shear force. If the device is spaced away from the track pin as has been described earlier herein, torque from a spinning track pin may not be effectively transferred to the device, lessening the risk that the device may become loose over time. As mentioned earlier, hand tools may be sufficient to install the pin retention device.

In FIG. 10, the right half of this figure from the midplane M illustrates what happens when the idler wheel or track roller 424 is angled relative to the track chain member 400 as represented by line 436 which is angled relative to the lateral direction L. This mimics what happens when the track chain member 400 with the crest member 410 is subjected to an uneven or angled terrain in use. The amount of stress generated by this situation can be seen by the various cross-hatching in concentric rings located near the outer lateral extremity 408. On the other hand, the left half of this figure from the midplane M illustrates what happens when the idler wheel or track roller is angled relative to the track chain member as represented by line 438 which is angled relative to the lateral direction L. Again, this mimics what happens when the track chain member without a crest member is subjected to an uneven or angled terrain. The amount of stress is considerably greater without the crest member. Thus, one skilled in the art would expect using the crest member to reduce the likelihood of fracturing or spalling, etc., helping to reduce the need for maintenance.

For the embodiments disclosed in FIGS. 11 and 13, FIG. 12 shows a FEA stress plot of a previous design of a track lug in the upper left hand corner thereof while it also shows a FEA stress plot of a track lug such as the first track lug 508 of FIGS. 11 and 13 in the lower right hand corner, showing a reduction in stress. This reduction in stress indicates to one skilled in the art that the likelihood of fracturing or spalling of the new design is less than the previous design.

Figure 14:
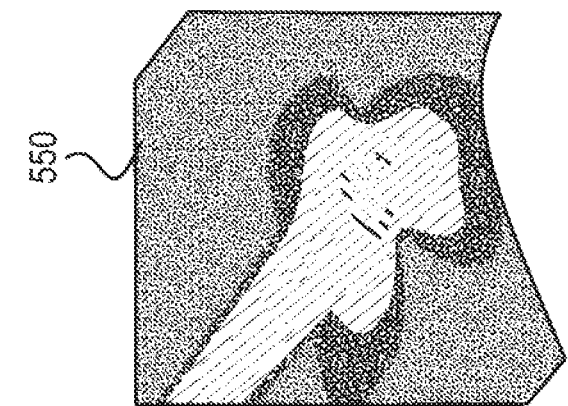
FIG. 14 contains FEA stress plots of a baseline design, an intermediate design and another design according to an embodiment of the present disclosure, showing how the track chain member has reduced stress.
Figure 14:
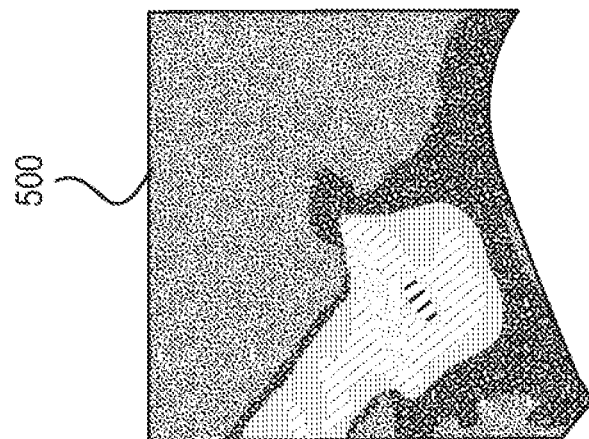
Figure 14:
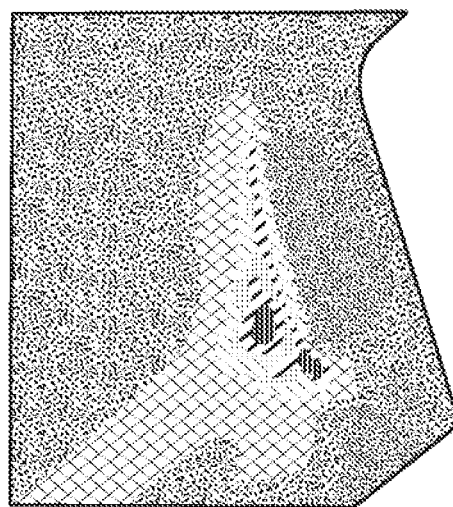
Figure 17:
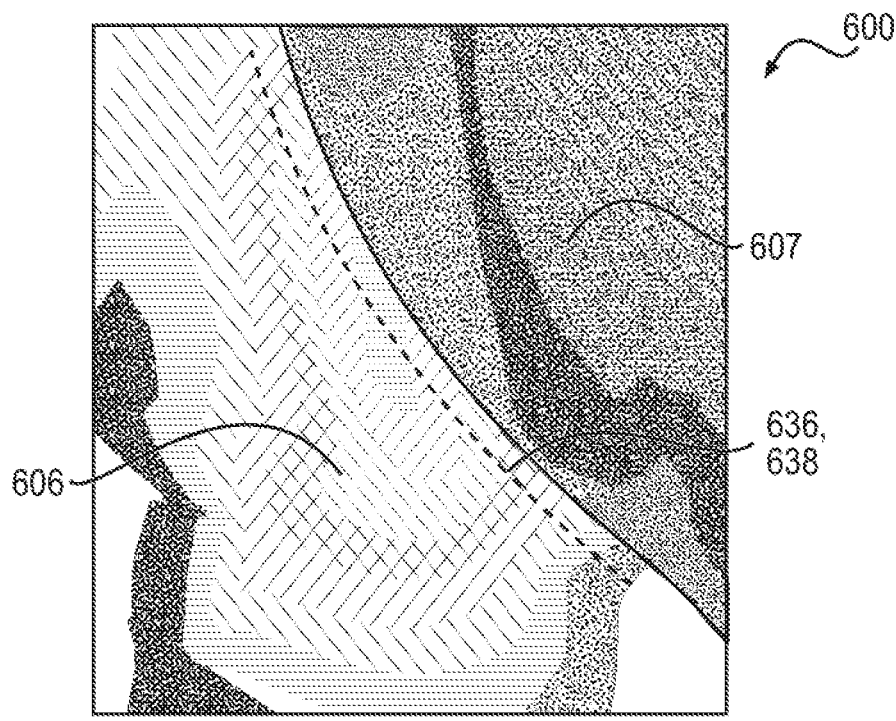
FIG. 17 is an enlarged view of the FEA stress plot of FIG. 16, showing the highest stress present on the front rib of FIG. 16.
Figure 18:
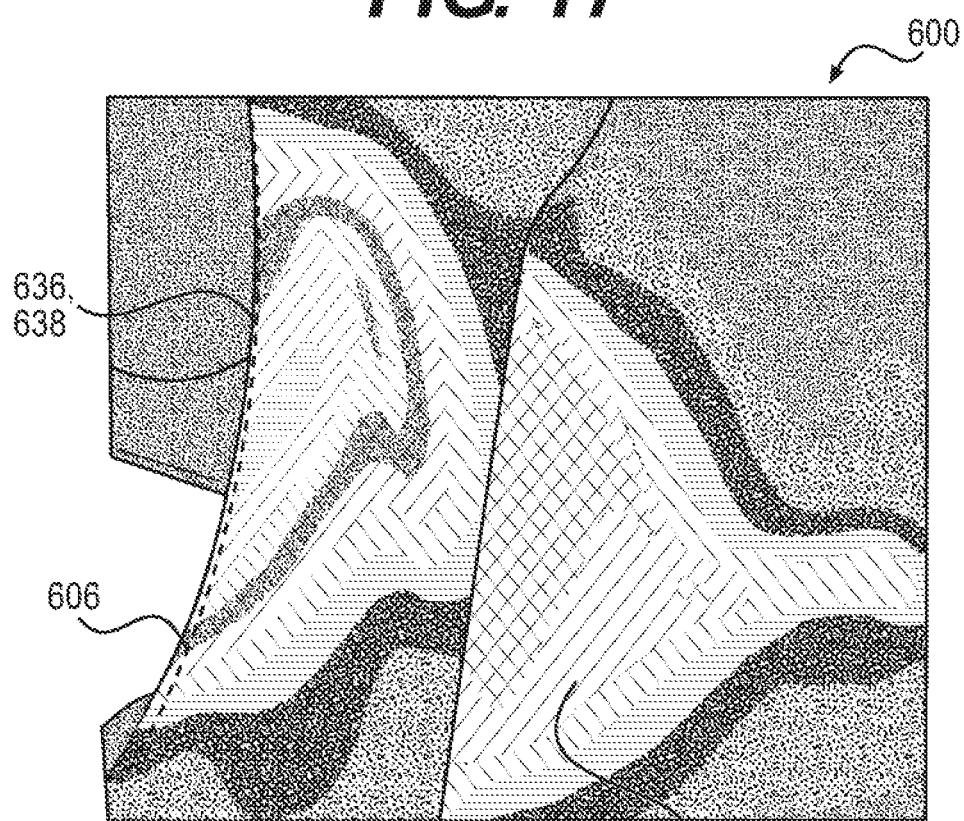
FIG. 18 is a FEA stress plot of the back rib of FIG. 16 shown from a rear perspective, indicating that the back rib experiences less stress than the front rib.

Likewise, FIG. 14 shows that the previous design, shown to the extreme left, has higher stress than that of the embodiment shown in FIGS. 11 and 13, seen in the middle labeled as 500, and that of another embodiment not shown in FIGS. 11 and 13, labeled as 550 at the extreme right. So, the improved designs will likely experience less fracturing and spalling. For the embodiments disclosed in FIGS. 15 and 16, the stress plot in FIG. 16 shows that the maximum stress under the simulated operating conditions is approximately 1400 MPa on the top portion of the track pad. To the contrary previous designs without the rib designs of FIGS. 15 and 16, were determined using a similar FEA modeling scenario to have peak stresses as high as 2300 MPa. FIGS. 17 and 18 illustrate that the first and second ribs experience a maximum stress of approximately 929 MPa. Once more, this indicates a lower likelihood of fracturing or spalling.

Figure 20:
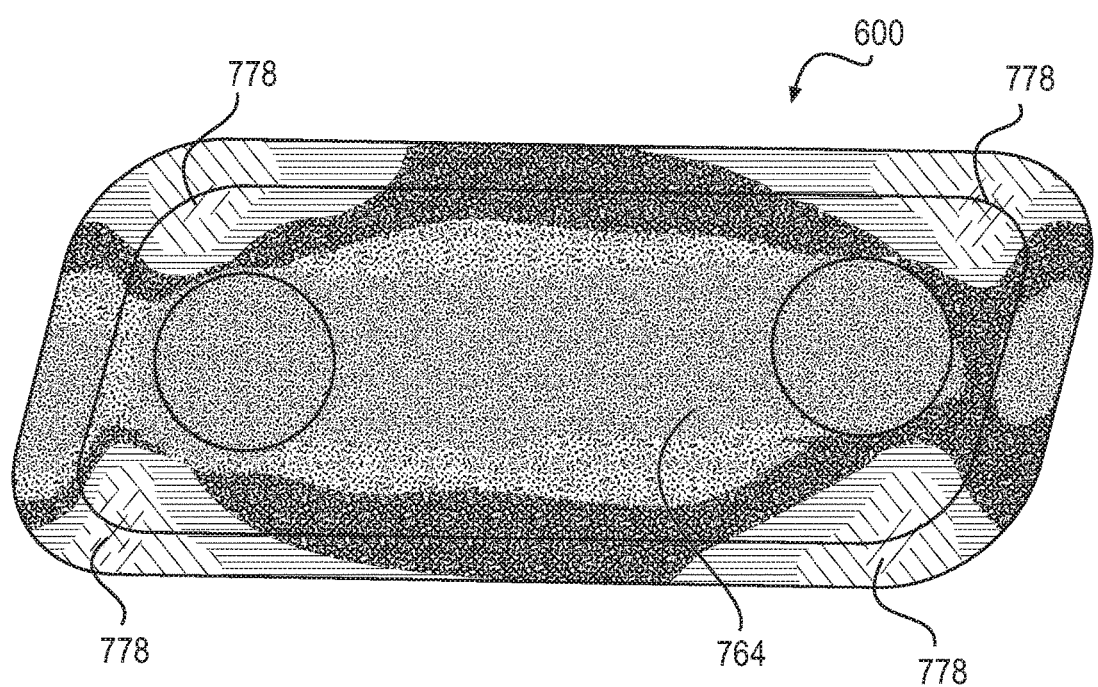
FIG. 20 is an enlarged FEA stress plot of the central void of the shoe member of FIG. 15, illustrating the maximum stress in this area of the shoe member.
Figure 21:
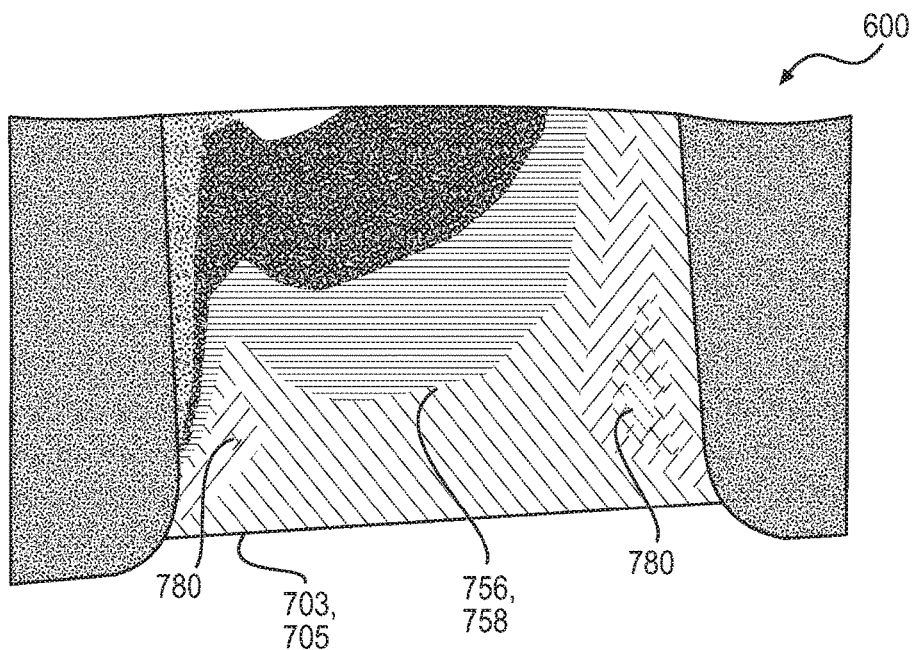
FIG. 21 is an enlarged FEA stress plot of the central side void of the shoe member of FIG. 15, illustrating the maximum stress in this area of the shoe member.

For the embodiments shown in FIGS. 15, 19 and 22, the stress plots in FIGS. 20 and 21 show that using the provision of the side voids 756, 758, and the central void 764 as well as using curved ribs in certain embodiments allows the stress to be reduced to about 500-650 MPa in the corners 778 of the central void 764 (see FIG. 20) and for the stress in the area 780 near a lateral end 703, 705 to be reduced to about 600-800 in the side void 756, 758 (see FIG. 21). For previous designs using a slot on the bottom of the track shoe that extends all the way across laterally, similar areas experienced a maximum stress ranging from 1700-1900 MPa. Again, this indicates that the likelihood of fracture or spalling was reduced.

Figure 23:
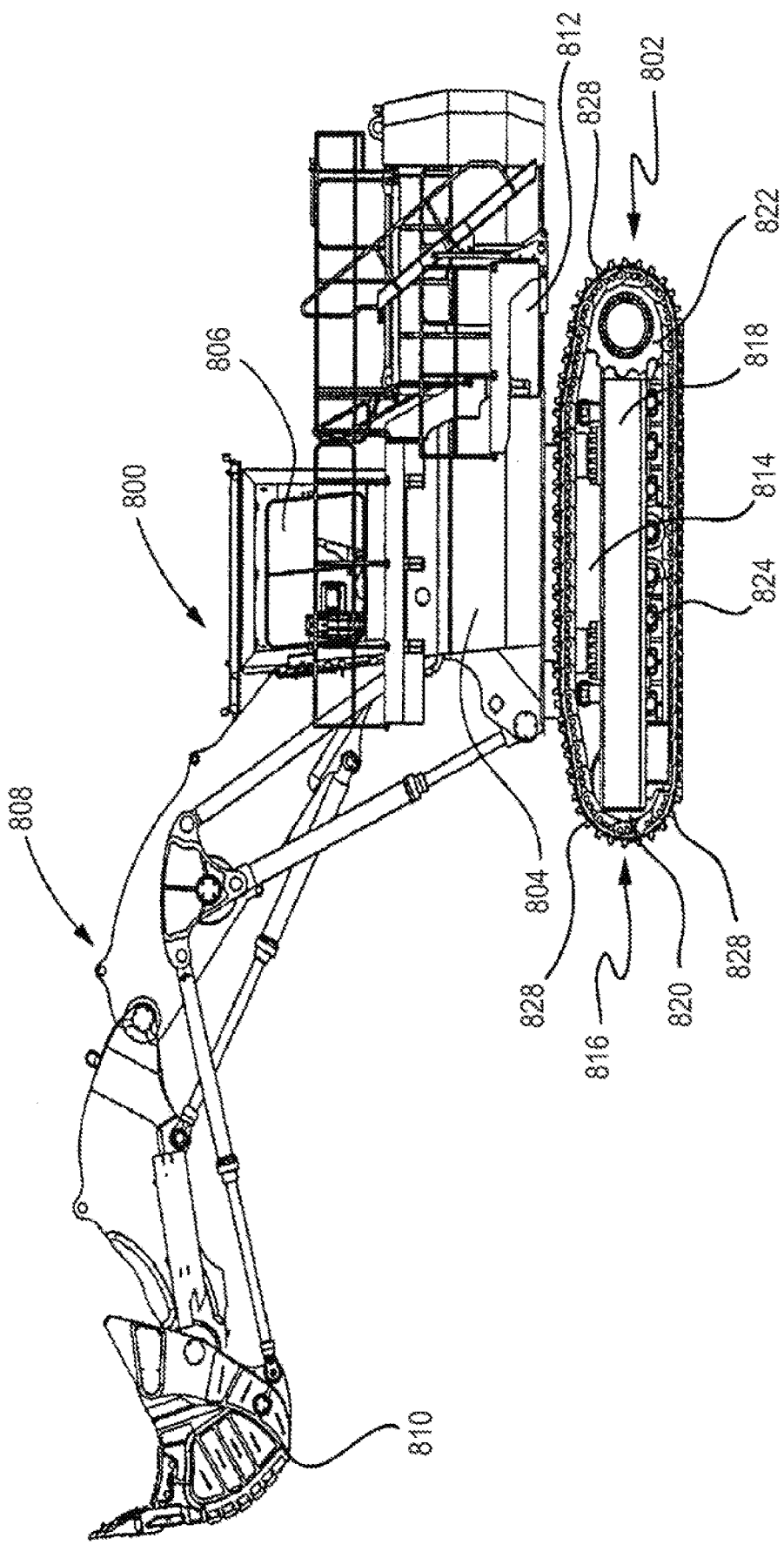
FIG. 23 illustrates another machine in the form of a hydraulic mining shovel that my use various track chain members, pin retention devices, and/or track chains according to the embodiments disclosed herein.

FIG. 23 shows an embodiment of a tracked machine 800 in the form of a hydraulic shovel that includes an embodiment of a track system 802 constructed in accordance with principles of the present disclosure. Among other uses, a hydraulic shovel can be used to load overburden and ore into haul trucks during the mining process in various surface mine applications.

While the arrangement is illustrated in connection with a hydraulic mining shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, cable shovel, or dragline or the like. Moreover, one or more implements may be connected to the machine. Such implements may be utilized for a variety of tasks, including, for example, lifting and loading.

As shown in FIG. 23, the machine 800 may include a body 804 with a cab 806 to house a machine operator. The machine may also include a boom system 808 pivotally connected at one end to the body 804 and supporting an implement 810 at an opposing, distal end. In embodiments, the implement 810 can be any suitable implement, such as a bucket, a clamshell, a blade, or any other type of suitable device. A control system can be housed in the cab 806 that can be adapted to allow a machine operator to manipulate and articulate the implement 810 for digging, excavating, or any other suitable application.

The body 804 may be supported on a main frame 812 supported on an undercarriage structure 814. The undercarriage structure 814 includes a supporting structure 818 that supports a track system 802 utilized for movement of the machine 800. The track system 802 may include first and second track roller frame assemblies 816, which are spaced from and adjacent respective first and second sides of the undercarriage structure 814. It will be appreciated that only one of the track roller frame assemblies 816 is visible in FIG. 23.

Each of the track roller frame assemblies 816 carries an idler wheel 820, a drive sprocket wheel 822, and a plurality of track guiding rollers 824. The drive sprocket wheel 822 is powered in forward and reverse directions by the machine 800. An endless track chain assembly 826 encircles each drive sprocket wheel 822, the idler wheel 820, and the track guiding rollers 824. The track chain assembly 826 includes a plurality of interconnected track pads 828, also referred to as track chain members herein. The track guiding rollers 824 guide the track pads 828 as the track chain assembly 826 is driven by the drive sprocket wheel 822. The track chain assembly 826 may have any track chain member, track pin retention device, and/or track chain assembly as previously described herein. It should be noted that the contents of FIG. 23 indicate that the apparatus disclosed by U.S. Pat. No. 9,409,613 may be modified to use any track chain member, track pin retention device, and/or track chain assembly as described herein.

For any of the embodiments discussed herein, the track chain assembly may comprise a plurality of track chain members that are similarly or identically configured. It is to be understood that at least two additional track chain members may be also provided that have different or dissimilar geometry as may be the case for two master links that are joined to the plurality of similar or identically configured track chain members, etc.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track chain member comprising:
    a shoe member defining a track chain traveling direction and a lateral direction perpendicular to the track chain traveling direction; and
    a track pad member extending from the shoe member including
        a first lug member extending from the shoe member in a first direction parallel to the track chain traveling direction,
        a second lug member and a third lug member both extending from the shoe member in a second direction opposite of the first direction; wherein
    the first, the second and the third lug members define a Y-shaped configuration including a single continuous Y-shaped flat rail surface, and the first lug defines a first lug width along the lateral direction and the track pad member defines a roller support surface defining a roller support surface width along the lateral direction and the first lug width ranges from 40-60% of the roller support surface width.

2. The track chain member of claim 1 wherein the first, second and third lugs define track pin bores.

3. The track chain member of claim 2 wherein the track bores of the first, second and third lug members have substantially the same diameters.

4. The track chain member of claim 1 wherein the first lug member width ranges from 96 to 106 mm.

5. The track chain member of claim 3 wherein the roller support surface width ranges from 191 to 211 mm.

6. The track chain member of claim 4 wherein the second lug member is spaced away from the third lug member, defining at least partially a void therebetween and the first lug member is laterally aligned with the void.

7. The track chain member of claim 6 defining a center of mass and a central axis passing through the center mass wherein the central axis is perpendicular to the lateral direction and the track chain traveling direction and the track chain member includes a circular array wherein the first, second and third lug members are rotated about the central axis 180 degrees, forming fourth, fifth and sixth lug members.

8. The track chain member of claim 7 further defining a central groove located at the central axis wherein the central groove extends generally in the track chain traveling direction.

9. The track chain member of claim 1 wherein the second lug member defines a second lug member width along the lateral direction, the third lug defines a third lug member width along the lateral direction, and the first lug member width is different than the second lug member width and the third lug member width.

10. The track chain member of claim 6 wherein the first lug member width is greater than the second lug member width but less than the third lug member width.

11. A track chain assembly comprising:
a plurality of interlocking track chain members wherein each track chain member defines a track chain traveling direction, a lateral direction perpendicular to the track chain traveling direction, and includes
a shoe member defining a shoe width along the lateral direction; and
a first track pad member defining a first track pad maximum width along the lateral direction, and a second track pad member defining a second maximum track pad width along the lateral direction, wherein a ratio of either the first or second track pad maximum widths to the shoe member width ranges from 1:4 to 3:4;
wherein the first and the second track pad members have a Y-shaped configuration including an uninterrupted Y-shaped planar rail surface formed by a first lug member, a second lug member, and a third lug member.

12. The track chain assembly of claim 11 wherein the first track pad member is spaced away from the second track pad member a predetermined distance along the lateral direction.

13. The track chain assembly of claim 11 wherein the first lug member extends from the shoe member in a first direction generally parallel to the track chain traveling direction, and
the second lug member and the third lug member both extend from the shoe member in a second direction opposite of the first direction and the first lug member defines a first lug width along the lateral direction and the first lug width ranges from 40-60% of either the first or the second maximum track pad widths.

14. The track chain assembly of claim 13 wherein the first, second and third lugs that define track pin bores.

15. The track chain assembly of claim 14 wherein the first lug width ranges from 96 to 106 mm.

16. The track chain assembly of claim 15 wherein either maximum track pad width ranges from 191 to 211 mm.

17. The track chain assembly of claim 16 wherein the first lug is laterally aligned between the second lug and third lug.

18. The track chain assembly of claim 17 wherein the second lug defines a second lug width along the lateral direction, the third lug defines a third lug width, and the first lug width is different than the second lug width and the third lug width.

19. The track chain member of claim 18 wherein the first lug width is greater than the second lug width but less than the third lug width.

* * * * *